United States Patent
Dunstan et al.

(10) Patent No.: US 7,582,380 B1
(45) Date of Patent: Sep. 1, 2009

(54) LITHIUM-ION CELL WITH A WIDE OPERATING TEMPERATURE RANGE

(75) Inventors: Thanthrimudalige D. J. Dunstan, Oak Ridge, TN (US); Josip Caja, Knoxville, TN (US)

(73) Assignee: Electrochemical Systems, Inc., Knoxville, TN (US)

(*) Notice: Subject to any disclaimer, the term of this patent is extended or adjusted under 35 U.S.C. 154(b) by 714 days.

(21) Appl. No.: 10/820,638

(22) Filed: Apr. 8, 2004

(51) Int. Cl.
*H01M 10/40* (2006.01)

(52) U.S. Cl. ............... 429/188; 429/231.1; 429/231.3; 429/303

(58) Field of Classification Search .............. None
See application file for complete search history.

(56) References Cited

U.S. PATENT DOCUMENTS

| | | | |
|---|---|---|---|
| 4,310,400 A | 1/1982 | Mark, Jr. et al. | 204/195 M |
| 5,552,241 A | 9/1996 | Mamantov et al. | 429/103 |
| 5,589,291 A | 12/1996 | Carlin et al. | 429/103 |
| 5,683,832 A | 11/1997 | Bonhote et al. | 429/111 |
| 5,827,602 A | 10/1998 | Koch et al. | 429/194 |
| 5,965,054 A | 10/1999 | McEwen et al. | 252/62.2 |
| 5,973,913 A | 10/1999 | McEwen et al. | 361/523 |
| 6,326,104 B1 | 12/2001 | Caja et al. | 429/188 |
| 6,365,301 B1 | 4/2002 | Michot et al. | 429/307 |
| 6,528,033 B1 | 3/2003 | Barker et al. | |
| 6,645,452 B1 | 11/2003 | Barker et al. | |
| 2005/0064282 A1 | 3/2005 | Inagaki et al. | |
| 2005/0069777 A1 | 3/2005 | Takami et al. | |
| 2006/0068282 A1* | 3/2006 | Kishi et al. | 429/188 |
| 2007/0003833 A1 | 1/2007 | Li et al. | |

FOREIGN PATENT DOCUMENTS

| | | |
|---|---|---|
| JP | 409139233 A | 5/1997 |
| WO | WO 97/02252 | 1/1997 |
| WO | WO 2005/064733 A1 | 7/2005 |

OTHER PUBLICATIONS

Koch, et al., *The Intrinsic Anodic Stability of Several Anions Comprising Solvent-Free Ionic Liquids*, J. Electrochem. Soc., vol. 143, No. 3 (Mar. 1996).
Lipsztajn, et al., *Electrochemical Reduction of N-(1-Butyl)Pyridinium Cation In 1-Methyl-3-Ethylimidazolium Chloride-Aluminium Chloride Ambient Temperature Ionic Liquids*, Electrochemica Acta, vol. 29, No. 10, pp. 1349-1352, (1984).
Fannin, Jr., et al., *Properties of 1,3-Dialkylimidazolium Chloride-Aluminum Chloride Ionic Liquids. 2. Phase Transitions, Densities, Electrical Conductivities, and Viscosities*, J. Phys. Chem, 88, 2614-2621 (1984).
Suarez, et al., *The Use Of New Ionic Liquids in Two-Phase Catalytic Hydrogenation Reaction By Rhodium Complexes*, Polyhedron, vol. 15, No. 7, pp. 1217-1219 (1996).
Suarez, et al., *Enlarged electrochemical window in dialkyl-imidazolium cation based room-temperature air and water-stable molten salts*, Electrochimica Acta, vol. 42, No. 16, pp. 2533-2535 (1997).
Wilkes, et al., *Air and Water Stable 1-Ethyl-3-methylimidazolium Based Ionic Liquids*, J. Chem Soc., Chem. Commun., pp. 965-966 (1992).
Gifford, et al., *A Substituted Imidazolium Chloroaluminate Molten Salt Possessing and Increased Electrochemical Window*, J. Electrochem. Soc., vol. 134, No. 3, pp. 610-614 (Mar. 1987).
Niyazymbetov, et al., *Electrochemical Oxidation of Nitroazole Anions*, translated from Izvestiya Akademii Nauk SSSR, Seriya Khimicheskaya, No. 10, pp. 2390-2391, published by Plenum Publishing Corp., (Oct. 1987).
Bonhote, et al., *Hydrophobic, Highly Conductive Ambient-Temperature Molten Salts*, Inorg. Chem. vol. 35, pp. 1168-1178 (1996).
Scordilis-Kelley, et al., *Alkali Metal Reduction Potentials Measured in Chloroaluminate Ambient-Temperature Molten Salts*, J. Electrochem. Soc., vol. 139, No. 3, pp. 694-699. (Mar. 1992).
Melton, et al., *Electrochemical Studies of Sodium Chloride as a Lewis Buffer for Room Temperature Chloroaluminate Molten Salts*, J. Electrochem. Soc., vol. 137, pp. 3865-3869. (Dec. 1990).
Fuller, et al. *Structure of 1-Ethyl-3-methylimidazolium Hexafluorophosphate: Model for Room Temperature Molten Salts*, J. Chem. Soc., Chem. Commun., pp. 299-300. (1994).
Fuller, et al., *The Room Temperature Ionic Liquid 1-Ethyl-3-methylimidazolium Tetrafluoroborate: Electrochemical Couples and Physical Properties*, J. Electrochem. Soc., vol. 144, No. 11, pp. 3881-3886. (Nov. 1997).
Carlin, et al., *Dual Intercalating Molten Electrolyte Batteries*, J. Electrochem. Soc., vol. 141, No. 7, pp. L73-L76. (Jul. 1994).
Carlin, et al., *Reversible Lithium-Graphite Anodes in Room-Temperature Chloroaluminate Melts*, J. Electrochem. Soc., vol. 141, No. 3, pp. L21-L22. (Mar. 1994).
Scordilis-Kelley, et al., *Stability and Electrochemistry of Lithium in Room Temperature Chloroaluminate Molten Salts*, J. Electrochem. Soc., vol. 141, No. 4, pp. 873-875. (Apr. 1994).
Fuller, et al. *In Situ Optical Microscopy Investigations of Lithium and Sodium Film Formation in Buffered Room Temperature Molten Salts*, J. Electrochem. Soc., vol. 143, No. 7, pp. L145-L147. (Jul. 1996).
Koch, et al., *The Interfacial Stability of Li with Two New Solvent-Free Ionic Liquids: 1,2-Dimethyl-3-propylimidazolium Imide and Methide*, J. Electrochem. Soc., vol. 142, No. 7, pp. L116-L118. (Jul. 1995).
Caja, et al., *Room Temperature Molten Salts (Ionic Liquids) as Electrolytes in Rechargeable Lithium Batteries*, published in SAE Aerospace Power Systems Conference (Apr. 6-8, 1999), Mesa, Arizona, pp. 217-222.

* cited by examiner

*Primary Examiner*—John S Maples
(74) *Attorney, Agent, or Firm*—Kilyk & Bowersox, P.L.L.C.

(57) ABSTRACT

A lithium-ion rechargeable cell is described which contains an electrolyte comprising a pyrazolium cation, an imidazolium cation, or a combination thereof, as well as lithium ion, and at least one non-Lewis acid derived counter-ion. Electrochemical cells containing an anode, a cathode, and the ionic liquid electrolytes preferably have effective charge/discharge capacity and charging efficiency at low temperatures and at high temperatures.

32 Claims, 17 Drawing Sheets

LITHIUM-ION CELL WITH A WIDE OPERATING TEMPERATURE RANGE

BACKGROUND OF THE INVENTION

The present invention relates to electrochemical cells. More particularly, the present invention relates to electrochemical cells using electrolytes, which are preferably capable of operating from ambient or low temperatures to higher temperatures such as about 170° C.

The concept of the lithium-ion or rocking chair batteries, where lithium ions intercalate and deintercalate between the cathode and the anode was introduced in the early nineteen eighties. In 1991, Sony Corporation introduced the first commercially viable lithium-ion secondary cell into the market. It contained coke as the anode and $LiCoO_2$ as the cathode. Electrolytes used in commercial lithium-ion cells contain organic solvents such as ethylene carbonate, dimethyl carbonate, 1,2-dimethoxy ethane together with a lithium salt (e.g., $LiPF_6$). During the first charge, solvent and the anion undergo reduction forming the solid electrolyte interphase (SEI); the lithium ion intercalation into the coke electrode occurs via the SEI. The SEI passivates the lithiated carbon anode from further reaction with the electrolyte and permits stable operation of the rechargeable cell. While this cell includes good charge and discharge cycling at ambient temperature and below, its high temperature operation is limited to 40 to 50° C. because of the volatility of the solvents utilized in making the battery, as well as the dissolution of the SEI in the electrolyte which leads to a thermal runaway.

The higher temperature performance of lithium-ion cells can be improved by incorporating anode materials which intercalate lithium ions at voltages higher than the reduction voltage of the electrolyte. Such cells show longer cycle life as solvent reduction at the electrode surface is eliminated, and do not suffer from a thermal runaway experienced by conventional lithium ion cells using coke or graphite as the anode. The higher voltage for lithium ion intercalation at the anode also eliminates the possibility of lithium metal deposition and dendrite formation, which shortens cell life. Possible anode materials for such cells include, $Li_4Ti_5O_{12}$ (1.5 V vs. Li), $LiWO_2$ (0.3-1.4 V), and $LiMoO_2$ (0.8-1.4 V). In spite of the above described advantages, the use of traditional volatile solvents as electrolytes, still limits the higher temperature operation. Gel type solid polymer electrolytes can extend the higher temperature limit, but as the cell is heated, the liquid separates from the solid polymer, which is a limitation factor that affects high temperature operation. A solid (dry) polymer electrolyte has poor conductivity at ambient temperature; therefore, such an electrolyte permits cell operation only at higher temperatures. Lithium metal rechargeable cells are advantageous because of their potential for high energy densities. However, the use of organic solvents in the electrolyte limits high temperature operation due to solvent volatility. A lithium metal rechargeable cell developed by Tadiran Ltd. has a 125° C. upper operation temperature limit due to polymerization of its solvent, 1,3-dioxalane.

Another class of electrolytes that can be used in the lithium-ion cells is based on ionic liquids. Ionic liquids are molten salts that are liquids at temperatures below 100° C. Ionic liquids comprise entirely of ions (positive ions or cations and negative ions or anions). They, generally, have high ionic conductivity, high thermal stability and wide electrochemical windows. Further, unlike the solvents in standard lithium ion cells, the ionic liquids are non-volatile and non-flammable.

Low temperature molten salts can consist of mixtures of compounds, (i.e., anions and cations) which are liquid at temperatures below the individual melting points of each individual compound. These mixtures, commonly referred to as "melts," can form molten compositions simultaneously upon contacting the components together or after heating and subsequent cooling.

Low temperature molten salts were used as electroplating baths by F. H. Harley and T. P. Wier, Jr. in 1948. These low temperature molten salts were obtained by combining aluminum chloride with certain alkylpyridinium halide salts, for example, N-ethylpyridinium bromide.

Since then additional ionic liquids were produced by mixing $AlCl_3$ with different organic cations containing a variety of substituents; however, the field was dominated by those containing 1-ethyl-3-methylimidazolium cation. Although these ionic liquids were useful in studying electrochemistry of both inorganic and organic solutes as well as organic and organometallic reactions, the disadvantage of these ionic liquids was the presence of anions ($AlCl_4^-$, $Al_2Cl_7^-$) derived from strong Lewis acid $AlCl_3$ which liberate toxic gas when exposed to moisture.

In 1992, a new class of water and oxygen stable ionic liquids was described by Wilkes and Zaworotko, and by Cooper and Sullivan. These ionic liquids had the anion derived from the Lewis acid $AlCl_3$ replaced by water and oxygen stable anions such as $BF_4^-$, $CH_3COO^-$, $CF_3SO_3^-$ and $CH_3SO_3^-$. Some of these ionic liquids (e.g $EMIBF_4$, EMITriflate) showed high electrochemical stability as well as thermal stability.

In addition, melts can contain an $EMI^+$ cation and $PF_6^-$ anion. Besides room temperature melts containing $EMI^+$ cations, melts have also been prepared with different cations, such as the 1,3 dialkylimidazolium cation and the 1,2,3 trialkylimidazolium cation. For example, 1-(n-butyl)-3-methylimidazolium cation utilizing anions such as $BF_4^-$, $PF_6^-$, and $AsF_6^-$ have been prepared. The latter melts show wider electrochemical windows than $EMI^+$ containing melts; however, they also show lower conductivity and lower melting points. In addition, the above melts are not stable toward lithium, a strong reducing agent.

Another class of ionic liquids is based on pyrazolium cation which is a structural isomer of the imidazolium cation. Pyrazolium tetrafluoroborate ionic liquids were observed to be stable to lithium metal from room temperature to high temperatures (150 to 160° C.). The application of ionic liquids in lithium metal rechargeable cells from ambient temperature to higher temperature (130° C.) using pyrazolium cation based ionic liquids is described in U.S. Pat. No. 6,326,104 B1, which is incorporated in its entirety by reference herein. The electrolytes used in these cells are reduced by lithium metal anode forming a passivating layer on its surface. Increase in cell resistance and decrease in capacity with cycling observed in these cells may be due to breakdown and reformation of the passivating layer. In addition, the electrolytes used in these cells contained anions such as $BF_4^-$ and $AsF_6^-$, that can dissociate to corresponding Lewis acids ($BF_3$ and $AsF_5$) and LiF, during high temperature operation, leading to cell deterioration. Further, U.S. Pat. No. 5,683,832 relates to hydrophobic liquid salts of imidazolium cations and Imide anions. U.S. Pat. No. 5,827,602 relates to specific hydrophobic ionic liquids and generally mentions various anions and cations, but only tests one of them and describes not preferred combinations to obtain electrical and physical properties critical to successful operation of the electrochemical cells.

The operation of passivation free lithium-ion cells, at ambient temperature, using ionic liquids is described in Nakagawa et al. (Yuasa-Jiho, 91, 31, 2001, J. Electrochem. Soc. 150, (6), A695-A700 (2003)) and Michot et al. (U.S. Pat. No. 6,365, 301 B1). In one example, $Li_4Ti_5O_{12}/LiCoO_2$ electrodes containing 1-ethyl-3-methylimidazolium tetrafluoroborate $(EMIBF_4)/LiBF_4$ electrolyte was cycled at ambient temperature producing over 150 cycles. In another example, $Li_4Ti_5O_{12}/LiCoO_2$ containing 1-ethyl-3-methylimidazolium bis-fluorosulformimidide (EMFSI)/LiFSI as electrolyte was used, where cycling results were not reported.

During the present studies it was observed that $Li_4Ti_5O_{12}/LiMn_2O_4$ and $Li_4Ti_5O_{12}/LiCoO_2$ cells containing $EMIBF_4/LiBF_4$ or 1-ethyl-2-methylpyrazolium tetrafluoroborate $(EMPBF_4)/LiBF_4$ as electrolyte, operated with stable capacity at ambient temperature and at slightly higher temperature; however, capacity was rapidly lost with cycling at 80° to 100° C. (≈80% decrease in 20 cycles).

The above references provide no solution for an electrochemical cell that can operate over a large range of temperatures. Therefore there is a need for lithium-ion cells that will operate from low temperature to higher temperatures (e.g., 170° C.). Such cells will find applications in oil/gas drilling operations, and also in automotive, aircraft and space environment as well as other applications.

SUMMARY OF THE PRESENT INVENTION

It is therefore a feature of the present invention to provide an electrochemical cell including a cathode, an anode, and an electrolyte from an ionic liquid containing at least one imidazolium and/or a pyrazolium cation and at least one non-Lewis acid derived anion, wherein the electrochemical cell can preferably operate at temperatures of from about ambient temperature (e.g., 20° C.) to about 170° C.

A further feature of the present application is to improve the cycling charging and discharging of an electrochemical cell.

A further feature of the present invention is to provide rechargeable lithium-ion cells which contain ionic liquids as electrolytes. The cells can include, in addition to the electrolyte, an anode, and a cathode. The anode may comprise lithium intercalating material such as $Li_4Ti_5O_{12}$, $LiWO_2$, and $LiMoO_2$. The cathode can comprise $Li_xMn_2O_4$; $Li_xCoO_2$; modified $Li_xMn_2O_4$ electrodes; $Li_xMn_{2-x}Cu_xO_4$, wherein $0.1<x<0.5$; $LiM_{0.02}Mn_{1.98}O_4$, wherein M can be B, Cr, Fe, and Ti; a transition metal oxide; or an electrochemically active conductive polymer; $LiFePO_4$, $LiCoPO_4$, $LiMnPO_4$, or a combination thereof.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to an electrochemical cell and an electrolyte for the cell, wherein the electrolyte can be in the form of a pyrazolium cation-containing molten salt, an imidazolium cation-containing molten salt, or a combination thereof, and at least one non-Lewis acid derived counter ion. The counter ion preferably includes bis(trifluoromethylsulfonyl)imide $(CF_3SO_2)_2N^-$ (imide), bis(perfluoroethylsulfonyl) imide $(CF_3CF_2SO_2)_2N^-$ (BETI), tris(trifluoromethylsulfonyl)methide $(CF_3SO_2)_3C^-$ (methide), trifluoromethylsulfonate $CF_3SO_3^-$ (triflate, TF) or a combination thereof. The electrolyte preferably exhibits an oxidation limit of greater than about 5V vs. lithium, reduction voltage less than 1.5 V vs. lithium, and is thermally stable to at least about 300° C.

A further feature of the present invention is to provide an electrochemical cell including anodes such as $Li_4Ti_5O_{12}$ and an ionic liquid electrolyte, wherein the lithium intercalation (and deintercalation) occurs without the reduction of the electrolyte. Therefore the cell operation occurs without the formation of a passivating layer on the anode.

An additional feature of the present invention is to provide an electrochemical cell comprising an anode, a cathode, and electrolyte wherein the cell has a ratio of cathode capacity to anode capacity of 2 or greater.

It is to be understood that both the foregoing general description and the following detailed description are exemplary and explanatory only and are intended to provide a further explanation of the present invention, as claimed.

The present invention may be more fully understood with reference to the accompanying drawings which are intended to illustrate, not limit, the invention.

DETAILED DESCRIPTION OF THE PRESENT INVENTION

Figure 1:
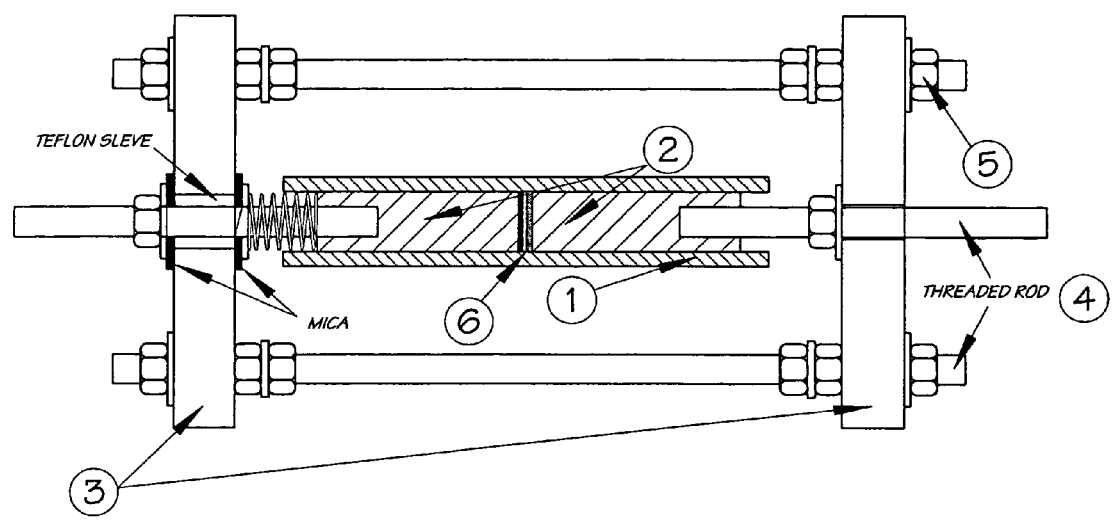
FIG. 1 is a schematic diagram of a test cell which can be used to test the cell performance over a wide temperature range.

The present invention relates to electrochemical cells which are useful for a variety of applications, including rechargeable electrochemical cells, for instance, lithium-ion cells. One of the preferred beneficial properties is the ability of the cells containing the electrolytes to cycle at ambient temperature, low temperatures, as well as high temperatures. This is an important property for practical operations of the electrochemical cell. Another embodiment of the present invention involves an improvement in one or more properties by using a ratio of cathode capacity to anode capacity of 2 or greater.

The electrochemical cells of the present invention contain water stable ionic liquids together with a lithium salt, as electrolytes which preferably have high stability toward oxidation (>5 V vs. lithium) and reduction (<1.5 V vs. lithium). The electrolytes used in the present invention, preferably, have a wide liquidus range and high thermochemical and electrochemical stability. These electrolytes are preferably salts and more preferably molten salts which generally have at least one cation and at least one anion as well as a dissolved lithium salt.

Preferably, the electrolytes used in the present invention contain at least one pyrazolium cation, imidazolium cation, or a combination thereof, together with a dissolved lithium salt. The electrochemical cell of the present invention also contains an anode, a cathode, a separator and, at least one electrolyte according to the present invention.

For purposes of the present invention, low temperature electrolytes (e.g. molten salts) are preferably electrolytes that are liquid below about 100° C. at standard pressure. According to embodiments of the present invention, the electrolyte or ionic liquid used in the electrochemical cell can contain a pyrazolium based cation, an imidazolium based cation, or a combination thereof, and a non-Lewis acid derived counter anion, together with a lithium salt. For purposes of the present application, the pyrazolium based cation can be a pyrazolium cation, a pyrazolium cation containing salt, and the like. Similarly, the imidazolium based cation can be an imidazolium cation or an imidazolium cation containing salt, and the like.

Preferably the non-Lewis acid derived counter anion includes an imide, a BETI, a methide, a triflate, or a combination thereof. The preferred electrolytes include those represented by the formulae:

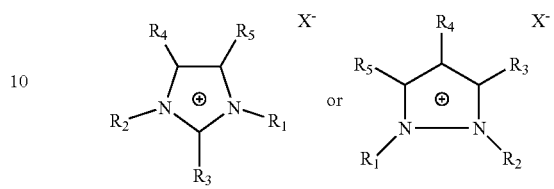

wherein $R_1$ and $R_2$ represent independently an alkyl group (e.g. C1-C12 alkyl), and $R_3$, $R_4$, and $R_5$ represent independently H, or an alkyl group (e.g., C1-C5 alkyl). $R_1$ and $R_2$ can be the same or different. $R_3$, $R_4$, and $R_5$ can be the same or different. Preferably, $R_2$ is a methyl group and $R_1$ is either a methyl group or an ethyl group.

$X^-$ is a counter ion (i.e. anion) and is preferably at least one of imide, BETI, methide, triflate or a combination thereof. The anion of the present invention can be selected from the following groups:

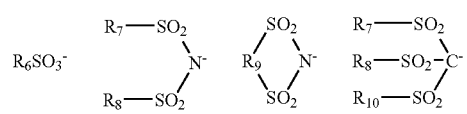

wherein $R_6$, $R_7$, $R_8$ and, $R_{10}$ (which can be the same or different) represent halogenated alkyl group (e.g., $C_1$-$C_4$ alkyl). $R_9$ represents a separate halogenated alkylene moiety (e.g. $C_2$ to $C_6$ alkylene). The halogen can be any halogen, such as F, Cl, Br. Examples of these anions include $CF_3SO_3^-$, $(CF_3SO_2)_3C^-$, $(CF_3SO_2)_2N^-$ and, $(CF_3CF_2SO_2)_2N^-$.

Particularly preferred formulae for cations include:

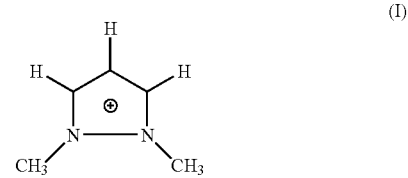

(I)

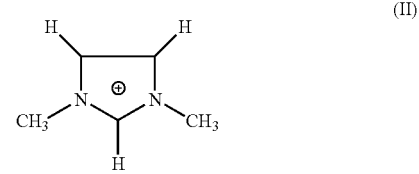

(II)

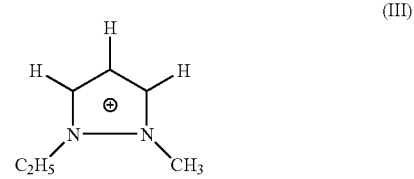

(III)

-continued

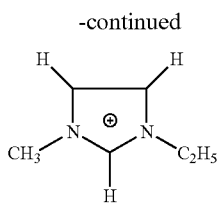
(IV)

The electrolytes used in the present invention can be hydrophobic or hydrophilic.

A combination of two or more molten salts can be used in the present invention. According to some embodiments of the present invention, the electrolyte comprises a binary molten salt comprising a mixture of single salts, at least one of which contains a pyrazolium cation, an imidazolium cation, or a combination thereof. If the electrolyte contains a binary system, the binary molten salt mixture preferably contains a second cation which differs from the primary cation, which is preferably an imidazolium cation or a pyrazolium cation. The second cation may be in the form of a lithium salt, such as lithium imide, lithium BETI, lithium methide, lithium triflate, and the like.

If the electrolyte contains two cations, each can be in the form of a salt, and the anions of the two salts may be the same or different from one another. The pyrazolium cation or the imidazolium cation, whichever may be the case, and the second cation may each be in the form of a salt. In one example, the primary cation, which can be an imidazolium cation or a pyrazolium cation is in a form of two salts that differ. In another example, the molten salt mixture includes two different salts, for example one salt containing an imidazolium cation. When the primary cation and the secondary cation are both in the form of a salt, at least one of the two salts can include 1,2-dimethylpyrazolium(DMP)BETI, 1,3-dimethylimidazolium (DMI)BETI, 1-ethyl-2-methylpyrazolium (EMP)BETI, EMIBETI, DMPimide, EMPimide, DMIimide, EMIimide, DMPmethide, EMPmethide, DMImethide, EMImethide, DMPTF, EMPTF, DMITF or EMITF. Each of the salts may comprise DMPBETI, DMIBETI, EMPBETI, EMIBETI, DMPimide, EMPimide, DMIimide, EMIimide, DMPTF, EMPTF, DMITF or EMITF. In all cases, the electrolyte also contains a dissolved lithium salt.

According to some embodiments of the present invention, the electrolyte can be a ternary mixture of three different cations. The electrolyte can include a mixture of three single salts, at least one of which contains a pyrazolium cation or an imidazolium cation. Preferably, the second cation differs from the first cation, which can be either a pyrazolium cation or an imidazolium cation, and a third cation can differ from the first cation and the second cation. At least one of the three cations can preferably be a lithium salt such as lithium imide, lithium BETI, or lithium triflate (LiTF). Preferably the lithium salt is selected from a Liimide, LiBETI, Limethide, LiTF or a combination thereof. The first cation, which can be either a pyrazolium or imidazolium cation, second cation, and/or third cation can be in the form of a salt, and the anions of the three salts may be the same or different. According to an embodiment of the present invention, at least one of the anions differs from the other two anions. In another example, the anions of the three salts are the same.

According to some embodiments of the present invention, the first cation, which can be a pyrazolium cation or an imidazolium cation, the second cation, and/or the third cation can be in the form of a salt, and at least one of the three salts comprises DMPBETI, DMIBETI, EMPBETI, EMIBETI, DMPimide, DMIimide, EMPimide, EMIimide, DMPmethide, DMImethide, EMPmethide, EMImethide, DMPTF, DMITF, EMPTF or EMITF. Two or more of the salts may be DMPBETI, DMIBETI, EMPBETI, EMIBETI, DMPimide, DMIimide, EMPimide, EMIimide, DMPmethide, DMImethide, EMPmethide, EMImethide, DMPTF, DMITF, or EMPTF, EMITF, and another one of the three salts can include Liimide, LiBETI, Limethide, LiTF, or a combination thereof.

In some embodiments, the pyrazolium cation, the imidazolium cation, or the combination thereof are in the form of a pyrazolium salt, an imidazolium salt, or a pyrazolium and imidazolium salts, which can be distributed throughout a polymer matrix.

The electrochemical cell of the present invention includes a cathode and an anode. Any known electrode material can be used as the cathode. For example, any electrode materials such as $Li_xMn_2O_4$; $Li_xCoO_2$; modified $Li_xMn_2O_4$ electrodes; $Li_xMn_{2-x}Cu_xO_4$, wherein $0.1<x<0.5$; $LiMo_{0.02}Mn_{1.98}O_4$, wherein M is selected from B, Cr, Fe, and Ti, a transition metal oxide; or an electrochemically active conductive polymer can be utilized as the cathode material. Additionally, the cathode can include $LiCoO_2$, $LiFePO_4$, $LiCoPO_4$, $LiMnPO_4$, or a combination thereof. Preferably, the cathode of the present invention is $LiCoO_2$ (e.g., 3.0 to 4.5 vs. Li; average 3.7 V) or $LiFePO_4$. The anode of the present invention can contain materials that intercalate lithium at voltages higher than the reduction voltage of the electrolyte. Preferably, the anode of the present invention includes $Li_4Ti_5O_{12}$ (1.5 V vs. Li).

In one example, the electrode material of the present invention containing $Li_4Ti_5O_{12}$ as the anode and $LiCoO_2$ as the cathode was charged at a constant current to a cutoff voltage of 2.5V (4.0V vs. Li) so that less than 50% of the lithium in $LiCoO_2$ was used in the cell operation. In the present invention, any ratio of cathode capacity/anode capacity can be used. Preferably, the ratio of cathode capacity/anode capacity is 2 or greater, (such as greater than 2.2, greater than 2.5, greater than 2.75, greater than 3, greater than 3.2, and so on.) Preferably, the ratio is 2 to 3 or 2.2 to 2.8. More preferably, the cathode is $LiCoO_2$ and the anode is $Li_4Ti_5O_{12}$ and the ratio of $LiCoO_2$ capacity/$Li_4Ti_5O_{12}$ capacity is greater than 2. This ratio provides capacity stability to the electrochemical cell operating at temperatures greater than 100° C.

The electrolyte used in the electrochemical cell of the present invention can exhibit an oxidation limit of greater than about 5 V vs. lithium, reduction voltage less than 1.5 V vs. lithium and a thermal stability of up to at least about 300° C.

According to some embodiments of the present invention, the electrolyte of the electrochemical cell includes an ionic liquid containing at least one imidazolium and/or pyrazolium cation and at least one non-Lewis acid derived anion, wherein the electrochemical cell operates from about ambient temperature (e.g., 20 to 25° C.) to a temperature of about 170° C. Preferably, the cell of the present invention provides consistent charge and discharge cycling at this broad temperature range.

The ionic liquid synthesis of the present invention can be derived from any established method. For example, EMIBETI can be synthesized from EMIC and LiBETI using the procedure described in U.S. Pat. No. 5,683,832, which is incorporated in its entirety by reference herein. Similarly, DMPBETI can be prepared using procedures described in U.S. Pat. No. 6,326,104 B1 and U.S. Pat. No. 5,683,832, which are incorporated in its entirety by reference herein. EMPBETI can be prepared by substituting diethyl sulfate for dimethyl sulfate. The ionic liquid can then be dried at 80° C.

under vacuum for five days. The melting point of EMPBETI was 27° C.-27.5° C. and that of DMPBETI was 74.8° C.-75.2° C. The moisture content of the three ionic liquids were then determined by Karl Fischer method to be between 24-35 ppm.

As stated previously, the anode for the present invention contains a higher voltage lithium intercalated electrode material. More preferably, the anode of the present invention includes $Li_4Ti_5O_{12}$. $Li_4Ti_5O_{12}$ can be prepared by methods described in the literature, for example, the method provided in U.S. Pat. No. 5,766,796, was used in this work. The $Li_4Ti_5O_{12}$ produced was ground and sieved; the fraction between 20-100 μm was used for electrode preparation. X-ray diffraction analysis illustrated that it contained approximately 95% $Li_4Ti_5O_{12}$.

Cathodes that can be used in the present invention include $Li_xMn_2O_4$; $Li_xCoO_2$; modified $Li_xMn_2O_4$ electrodes; $Li_xMn_{2-x}Cu_xO_4$, wherein 0.1<x<0.5; $LiM_{0.02}Mn_{1.98}O_4$, wherein M is selected from B, Cr, Fe, and Ti: a transition metal oxide; or an electrochemically active conductive polymer. More preferably, the cathode includes $LiCoO_2$, $LiFePO_4$, $LiCoPO_4$, $LiMnPO_4$, or a combination thereof. Most preferably, the cathode includes $LiCoO_2$ or $LiFePO_4$. The $LiFePO_4$ of the present invention is prepared by using the material given in Anderson et al. (Electrochemical and Solid State Letters 3, 66-68 (2000)). After decomposition of the starting materials in vacuum at 300° C., the material was powdered and heated at 800° C. for 24 hours under argon as described in Padhi et al. (J. Electrochem. Soc. 144, 1188-1194 (1997)).

The present invention can be used in all electrochemical cell devices, including but not limited to, batteries and the like. The components of these devices would include the electrochemical cell of the present invention along with conventional components that form the device. All patents, applications, and other publications mentioned herein are incorporated in their entirety by reference herein.

The present invention will be further clarified by the following examples, which are intended to be exemplary of the present invention.

EXAMPLES

Oxidation and Reduction Potentials of the Ionic Liquids

Oxidation and reduction potentials of EMIBETI, EMPBETI, and DMPBETI depending on temperature were determined by cyclic voltammetry. Cyclic voltammetry measurements were performed on an EG&G Model 273 Potentiostat/Galvanostat. Cyclic voltammograms were acquired in small volume cells (0.1 mL to 3 mL) obtained from Cypress Systems, Inc. Lawrence, Kans. modified in house utilizing mini-glassy carbon (diameter 1 mm), platinum (diameter 0.5 mm), or tungsten (diameter 0.75 mm) as working electrodes, mini-platinum electrode as the counter electrode, and silver wire electrode as the quasi reference electrode. Potential of Ag quasi reference electrode was ~3.0 V vs. lithium electrode (J. Electrochem. Soc., 146, 1687 (1999)). Cyclic voltammograms were obtained at a sweep rate of 50 mV/sec and potential measured at 1 mA/cm$^2$.

Table 1 illustrates oxidation and reduction potentials of EMIBETI, EMPBETI and DMPBETI depending on temperature at glassy carbon, platinum, and tungsten electrodes.

TABLE 1

Oxidation and reduction potentials for EMIBETI, EMPBETI and DMPBETI depending on temperature at glassy carbon, platinum and tungsten electrodes (quasi Ag reference electrode)

| | | Oxidation - reduction potentials (Volts) | | |
| --- | --- | --- | --- | --- |
| Electrode | T (° C.) | EMIBETI | EMPBETI | DMPBETI |
| GCE | RT | +2.50-2.05 | +2.45-2.20 | |
| Pt | RT | +2.45-2.00 | +2.75-1.90 | |
| | 95 | | +2.70-1.75 | |
| | 106 | +2.45-1.50 | | |
| | 110 | | +2.60-1.55 | |
| | 150 | | +2.50-1.50 | |
| W | RT | | +2.80-1.90 | |
| | 98 | | +2.60-1.75 | |
| | 100 | | | 2.40-1.85 |
| | 150-155 | +2.50-1.50 | +2.50-1.70 | 2.25-1.80 |

RT—room temperature (~25° C.)
Electrodes:
GCE—glassy carbon electrode
Pt—platinum electrode
W—tungsten electrode Table 1 indicates that oxidation and reduction potentials at RT for EMPBETI are almost identical on Pt and W electrodes while they are less positive and more negative on GCE. For EMIBETI they are almost identical on GCE and Pt electrode. Further, these potentials are very similar on GCE except for reduction potentials which are more negative for EMPBETI. When the temperature was increased, both oxidation and reduction potentials decreased. It appears that the reduction potentials of pyrazolium based ionic liquids are affected less by an increase in temperature than those of imidazolium based ones. For example, reduction potentials of EMPBETI and DMPBETI at 150-155° C. are more negative than that of EMIBETI (−1.7V, −1.8V, and −1.5V, respectively). Above results indicate that in most cases, the reduction potentials are more negative than the corresponding potential for a fully charged anode $Li_4Ti_5O_{12}$ (1.5 V vs. Li) even at a temperature of 150-155° C.; thus it is fair to assume that the cell $LiCoO_2$/$Li_4Ti_5O_{12}$ containing the above mentioned ionic liquids operates at high temperatures without electrolyte decomposition.

Electrochemical Cells

The cells were constructed employing an α-alumina tube (1) with inner diameter of 0.5 inch as the body of the cell (FIG. 1). Two 304 stainless steel cylinders (current collectors) (2) were introduced into the α-alumina tube; one of the cylinders was spring loaded. The cylinders were mounted between two flanges (3), which were held at the same length and position, using three stainless steel threaded rods (4). The rods protruded through the flanges and were held together by bolts (5). All metal parts were made of 304 stainless steel except for the spring which was made of 18/8 stainless steel.

The electrodes, the separator, and the electrolyte (6) were set between stainless steel cylinders.

The $LiCoO_2$ cathode was made by mixing $LiCoO_2$ (EM Industries, Hawthorne, N.Y.), and carbon with a solution of polyvinylidene fluoride (PVDF, Solvay 20810, Solvay Advanced Polymers, Inc. Houston, Tex.) in acetone to form a slurry which was stirred to obtain a homogeneous composition. The slurry was spread on an aluminum foil and was dried first in air and next in vacuum at 80° C. to 90° C. overnight. The ratio of $LiCoO_2$:C:PVDF was 85:5:10. The $Li_4Ti_5O_{12}$ anode was made by mixing $Li_4Ti_5O_{12}$ and carbon with a solution of polyvinylidene fluoride (PVDF) in acetone to form a slurry, which was stirred to obtain a homogeneous composition. The slurry was spread on a copper foil and was dried first in air and next in vacuum at 80° C.-90° C. overnight. The ratio of $Li_4Ti_5O_{12}$:C:PVDF was 85:5:10. Whatman glass microfibre filter was used as a separator.

The diameters of the electrodes were 0.5 inch each.

Example 1

The cell $LiCoO_2$/EMIBETI+0.8 molal $LiBETI/Li_4Ti_5O_{12}$

Figure 2:
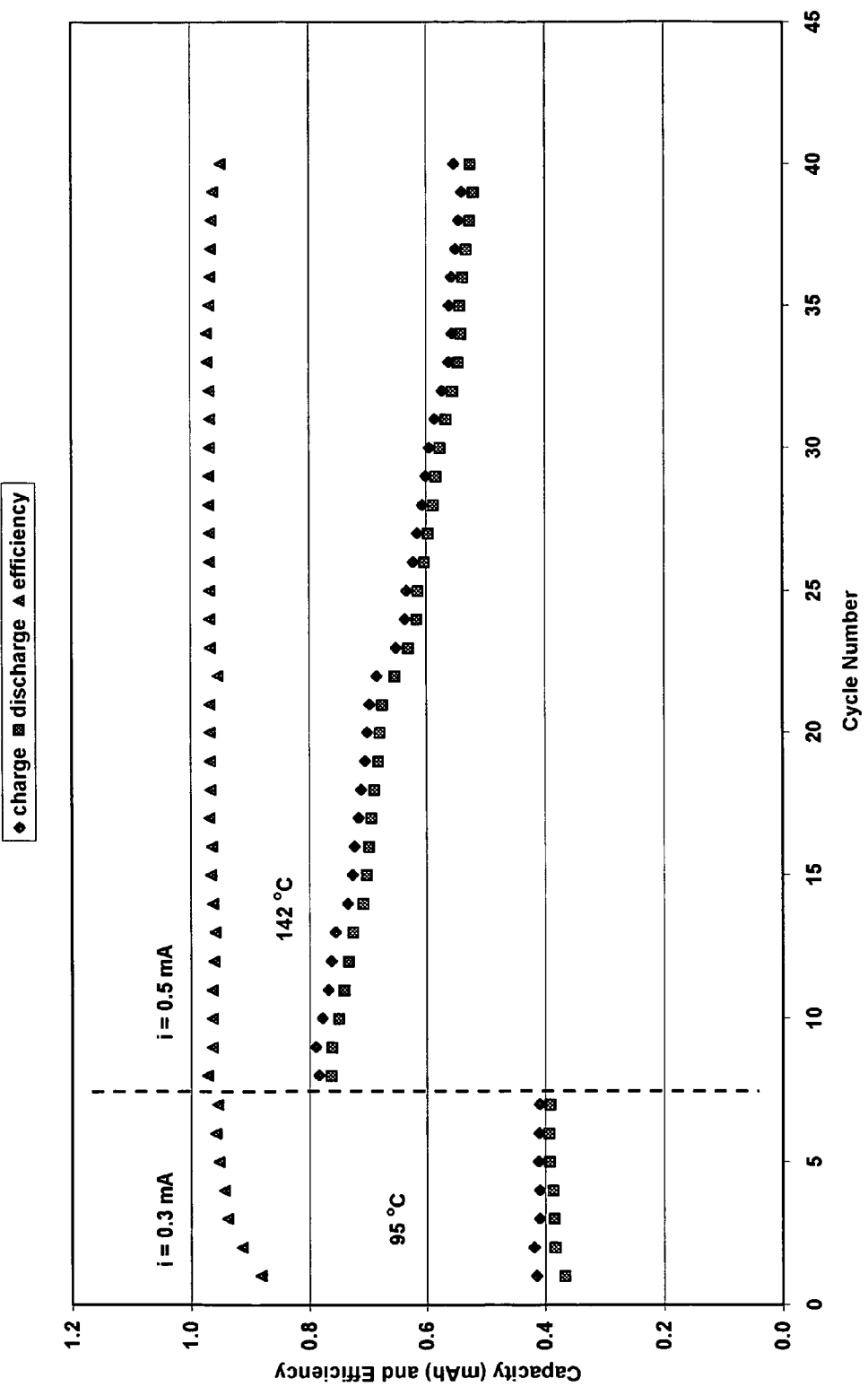
FIG. 2 is a graph illustrating the charging/discharging capacity and efficiency versus cycle number for a test cell, where the ratio of cathode capacity to anode capacity (C/A)=1.08, at temperatures of 95° C. and 142° C., using 0.3 mA and 0.5 mA currents.
Figure 3:
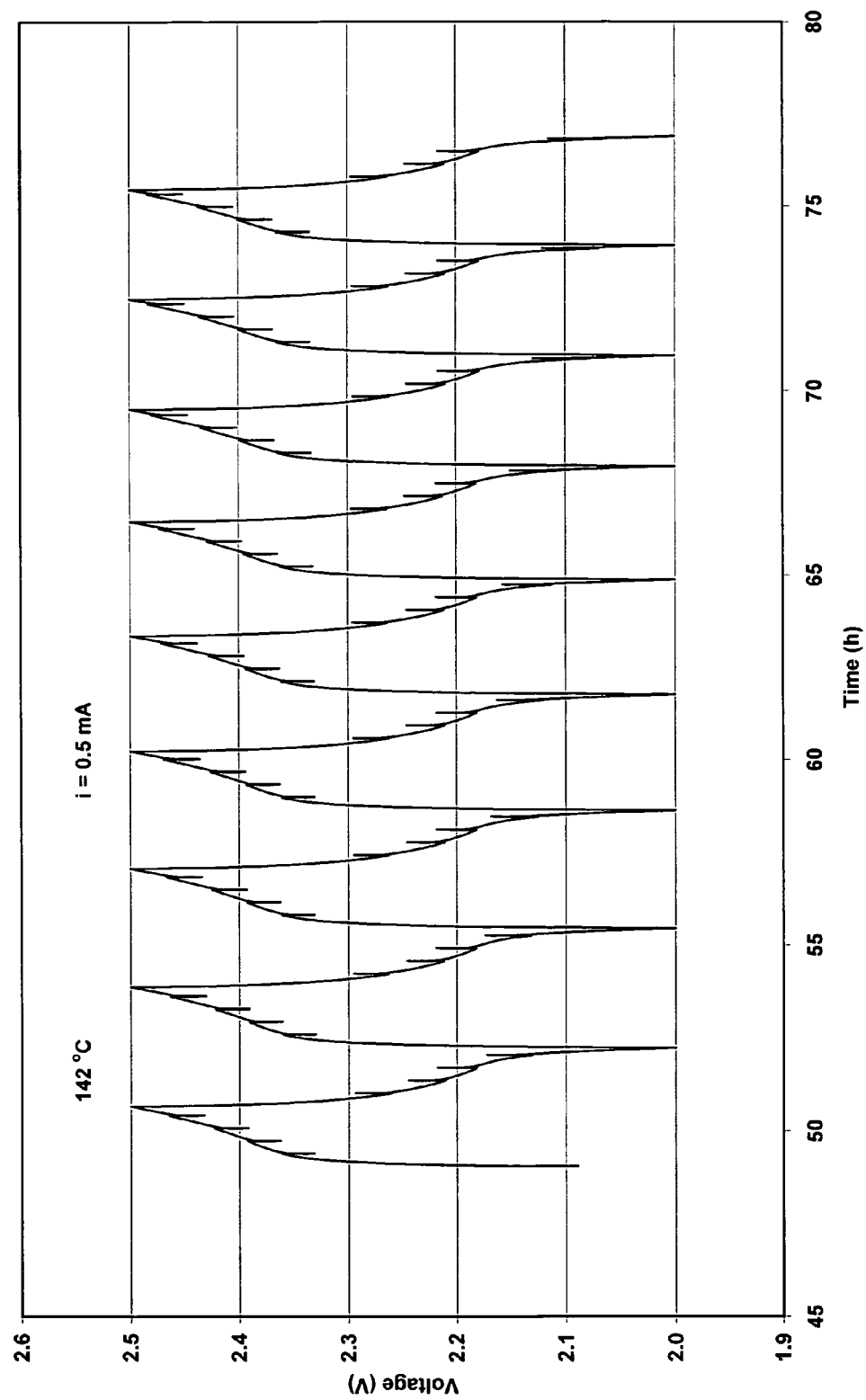
FIG. 3 is a graph illustrating charging/discharging curves for the test cell in FIG. 2, where the ratio C/A=1.08, at 142° C. using 0.5 mA current.

The cathode had a practical capacity of 2.1 mAh and the anode had a capacity of a 1.9 mAh. (ratio cathode capacity/anode capacity C/A=1.08). The cut-off voltages for charge/discharge cycling were set at 2.5V on charge and 2.0 V on discharge. However, for high current discharges, the cut-off voltage was set at 1.8 V. Results for cycling at 95° C. using 0.3 mA current and at 142° C. using 0.5 mA are shown in FIG. 2. Charge/discharge cycles are shown in FIG. 3. The cell capacity was stable with cycling at 95° C. However, at 142° C. cell capacity decreased progressively with cycling (30% decrease in 30 cycles).

Example 2

The cell $LiCoO_2$/EMIBETI+0.8 molal $LiBETI/Li_4Ti_5O_{12}$ with the cathode having a practical capacity of 3.0 mAh and the anode with 1.72 mAh (C/A=1.7).

Figure 4:
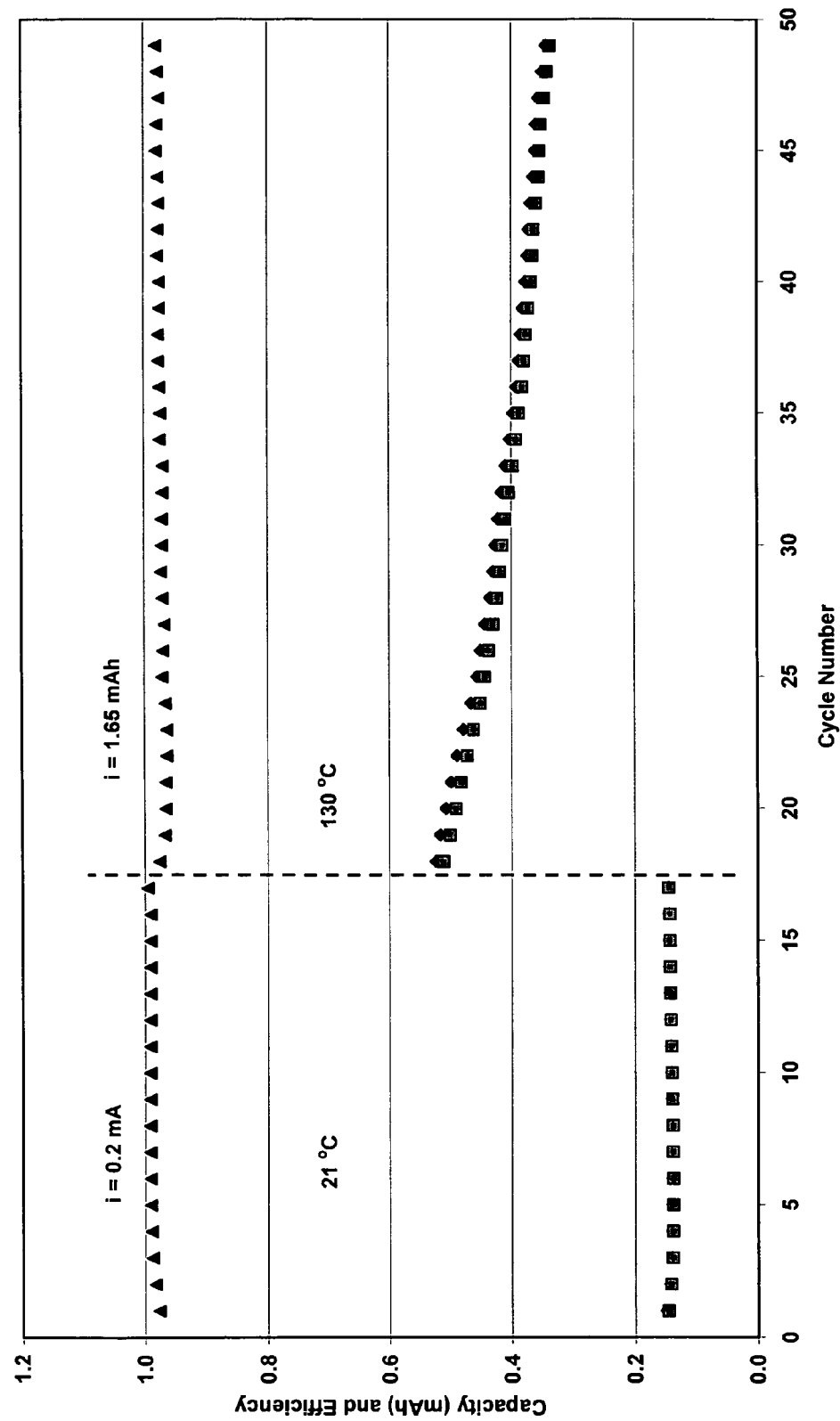
FIG. 4 is a graph illustrating the charging/discharging capacity and efficiency versus cycle number for a test cell, where the ratio C/A=1.7, at 21° C. and 130° C. using 0.2 mA and 1.65 mA currents.

Cut-off voltages for cycling were set at 2.5 V for charge and 2.0 V for discharge. When the cell was cycled at 21° C. using 0.2 mA current, the cell showed stable capacity, but at 130° C. using 1.65 mA current, the cell capacity decreased progressively (34% decrease in 30 cycles, FIG. 4).

Example 3

The cell $LiCoO_2$/EMIBETI+0.8 molal $LiBETI/Li_4Ti_5O_{12}$ with the cathode having a practical capacity of 3.75 mAh and the anode with 2.1 mAh (C/A=1.8).

Figure 5:
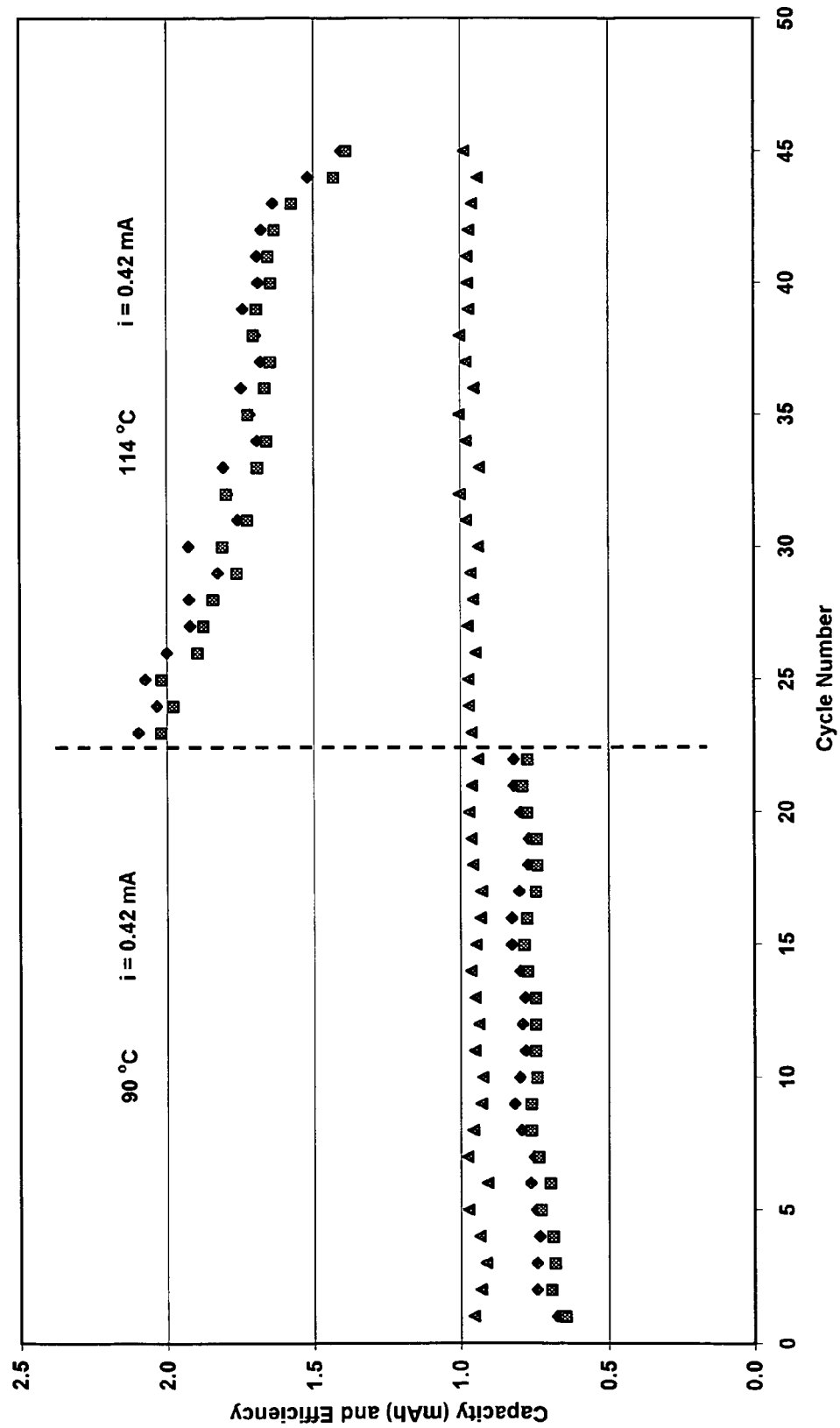
FIG. 5 is a graph illustrating the charging/discharging capacity and efficiency versus cycle number for a test cell, where ratio C/A=1.8, at 90° C. and 114° C. using 0.42 mA current.

Cut-off voltages for cycling were set at 2.5 V for charge and 2.0 V for discharge. When the cell was cycled at 90° C. (0.42 mA), the cell showed stable capacity, but at 114° C. (0.42 mA) the capacity decreased with cycling (30% decrease in 20 cycles, FIG. 5).

Example 4

The cell $LiCoO_2$/EMIBETI+0.8 molal $LiBETI/Li_4Ti_5O_{12}$ with the cathode having a practical capacity of 2.56 mAh and the anode with 2.1 mAh (C/A=1.2).

Figure 6:
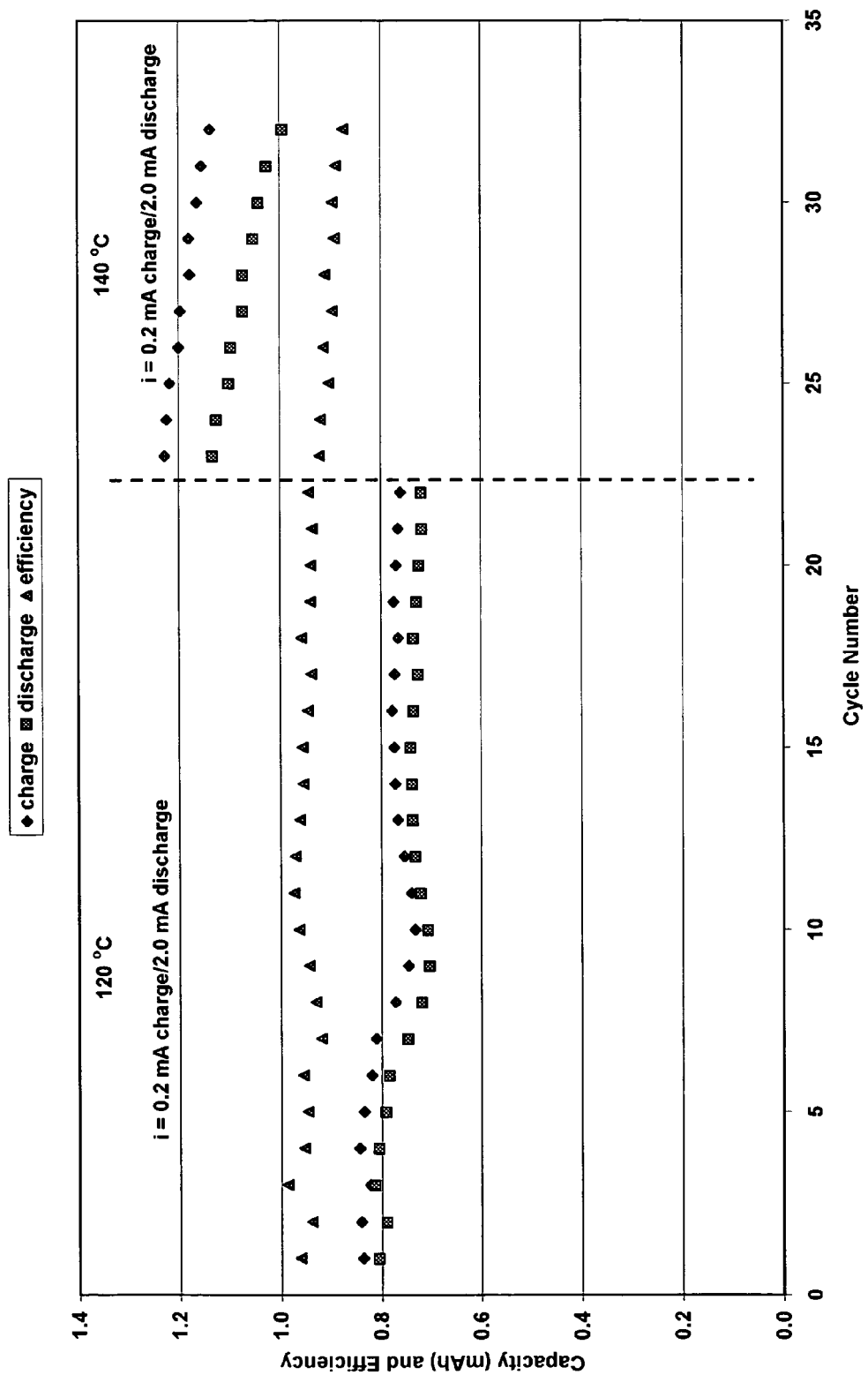
FIG. 6 is a graph illustrating the charging/discharging capacity and efficiency versus cycle number for a test cell, where the ratio C/A=1.2, at 120° C. and 140° C. using 0.2 mA charge/2.0 mA discharge currents.

Cut-off voltages for cycling were set at 2.5 V on charge and 1.8 V on discharge. At 120° C. (0.2 mA charge/2.0 mA discharge) the capacity decreased slowly with cycling (11% decrease in 20 cycles), while at 140° C., it decreased at a higher rate (13% in 10 cycles, FIG. 6).

Example 5

The cell $LiCoO_2$/EMIBETI+0.8 molal $LiBETI/Li_4Ti_5O_{12}$ with the cathode having a practical capacity of 3.0 mAh and the anode with 2.0 mAh (C/A=1.5).

Figure 7:
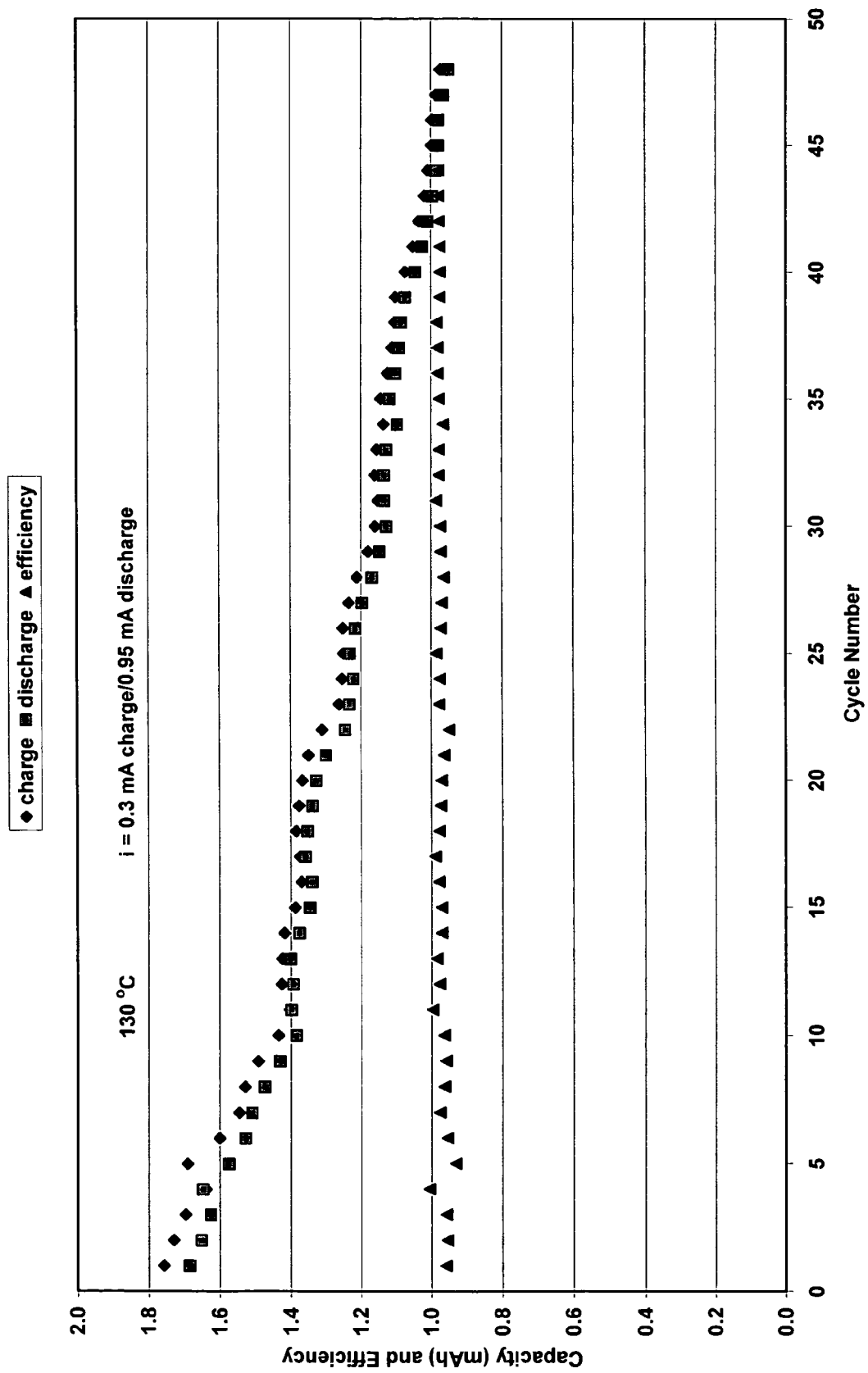
FIG. 7 is a graph illustrating the charging/discharging capacity and efficiency versus cycle number for a test cell, where the ratio C/A=1.5, at 130° C. using 0.3 mA charge/0.95 mA discharge currents.

Cut-off voltages for cycling were set at 2.5 V on charge and 1.8 V on discharge. When it was cycled at 130° C. (0.3 mA charge/0.95 mA discharge) the cell capacity decreased continuously (44% decrease in about 50 cycles FIG. 7).

Example 6

The cell $LiCoO_2$/EMIBETI+0.8 molal $LiBETI/Li_4Ti_5O_{12}$ with the cathode having a practical capacity of 3.15 mAh and the anode with 1.5 mAh (C/A=2.1).

Figure 8:
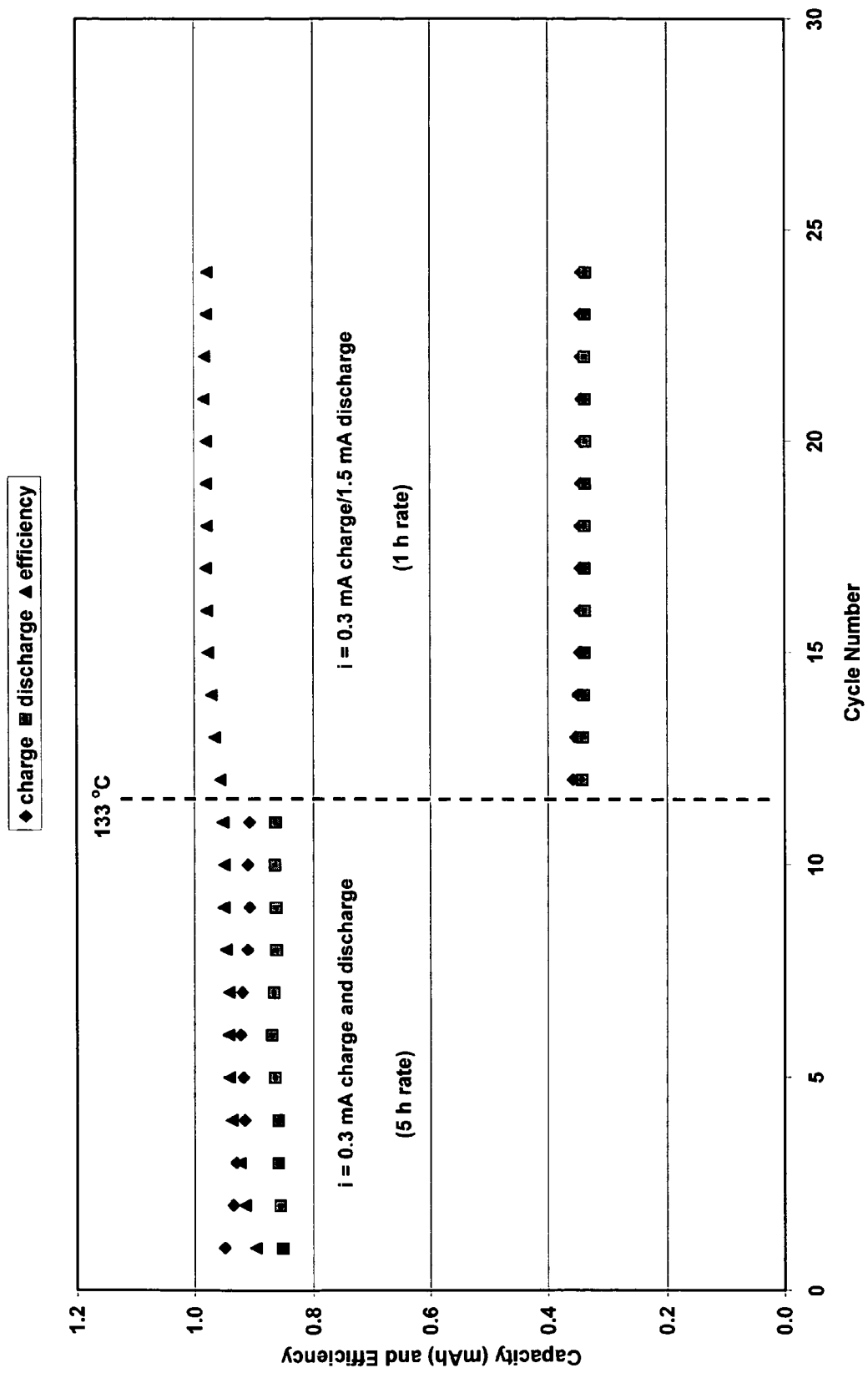
FIG. 8 is a graph illustrating the charging/discharging capacity and efficiency versus cycle number for a test cell, where ratio C/A=2.1, at 133° C. using 0.3 mA charge/discharge currents followed by 0.3 mA charge/1.5 mA discharge currents.

The cell was cycled at 133° C. using 0.3 mA for both charge and discharge (cut-off voltages 2.5/2.0 V) and later with 0.3 mA for charge and 1.5 mA for discharge (cut-off voltages 2.5/1.8 V). The cell showed stable capacity with cycling under both conditions (FIG. 8).

Figure 9:
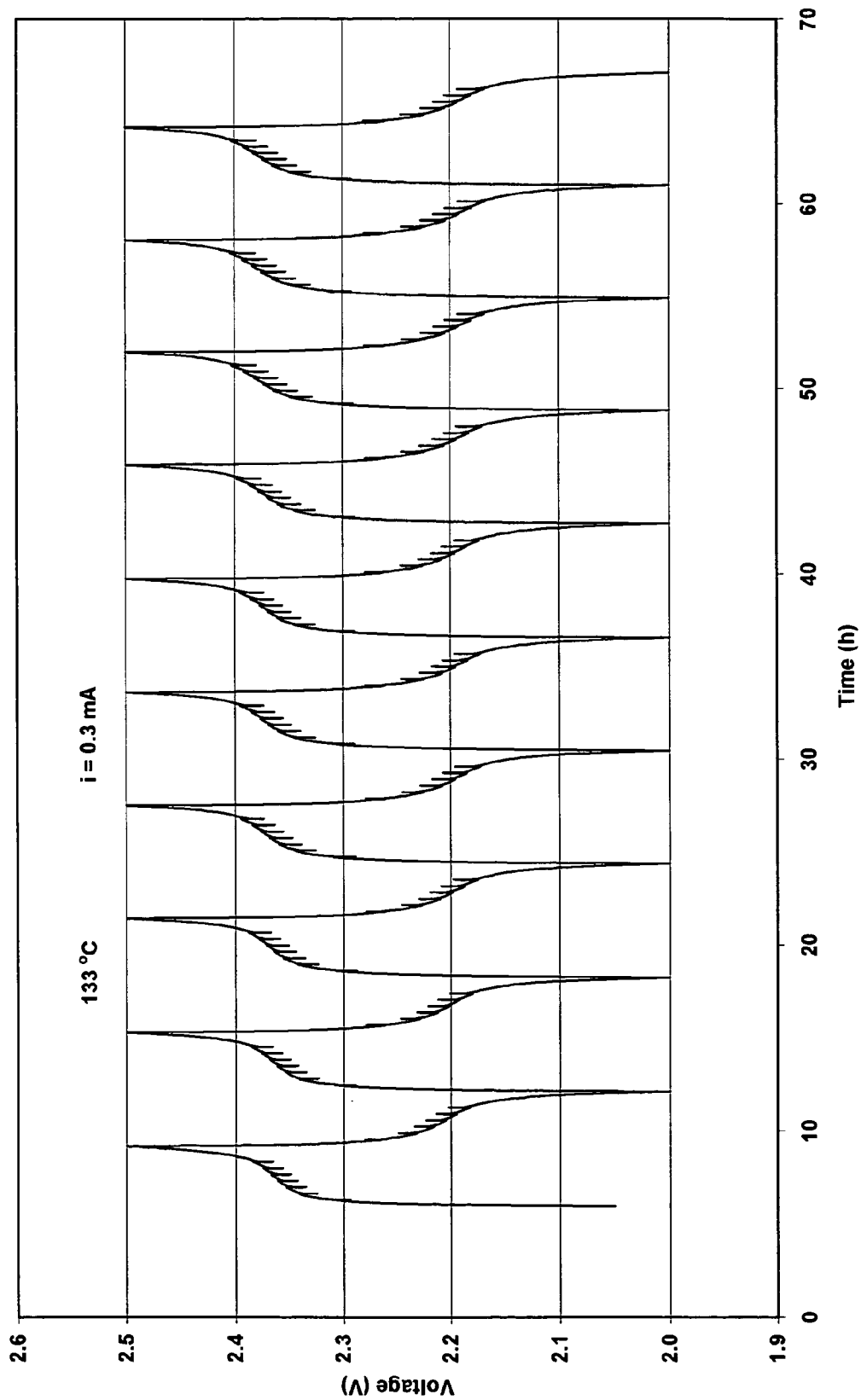
FIG. 9 is a graph illustrating charging/discharging curves for the test cell in FIG. 8, where the ratio C/A=2.1, at 133° C. using 0.3 mA current.

Charge/discharge cycles are shown in FIG. 9.

Example 7

The cell $LiCoO_2$/EMIBETI+0.8 molal $LiBETI/Li_4Ti_5O_{12}$ with the cathode having a practical capacity of 1.4 mAh and the anode with 0.6 mAh (C/A=2.3).

Figure 10:
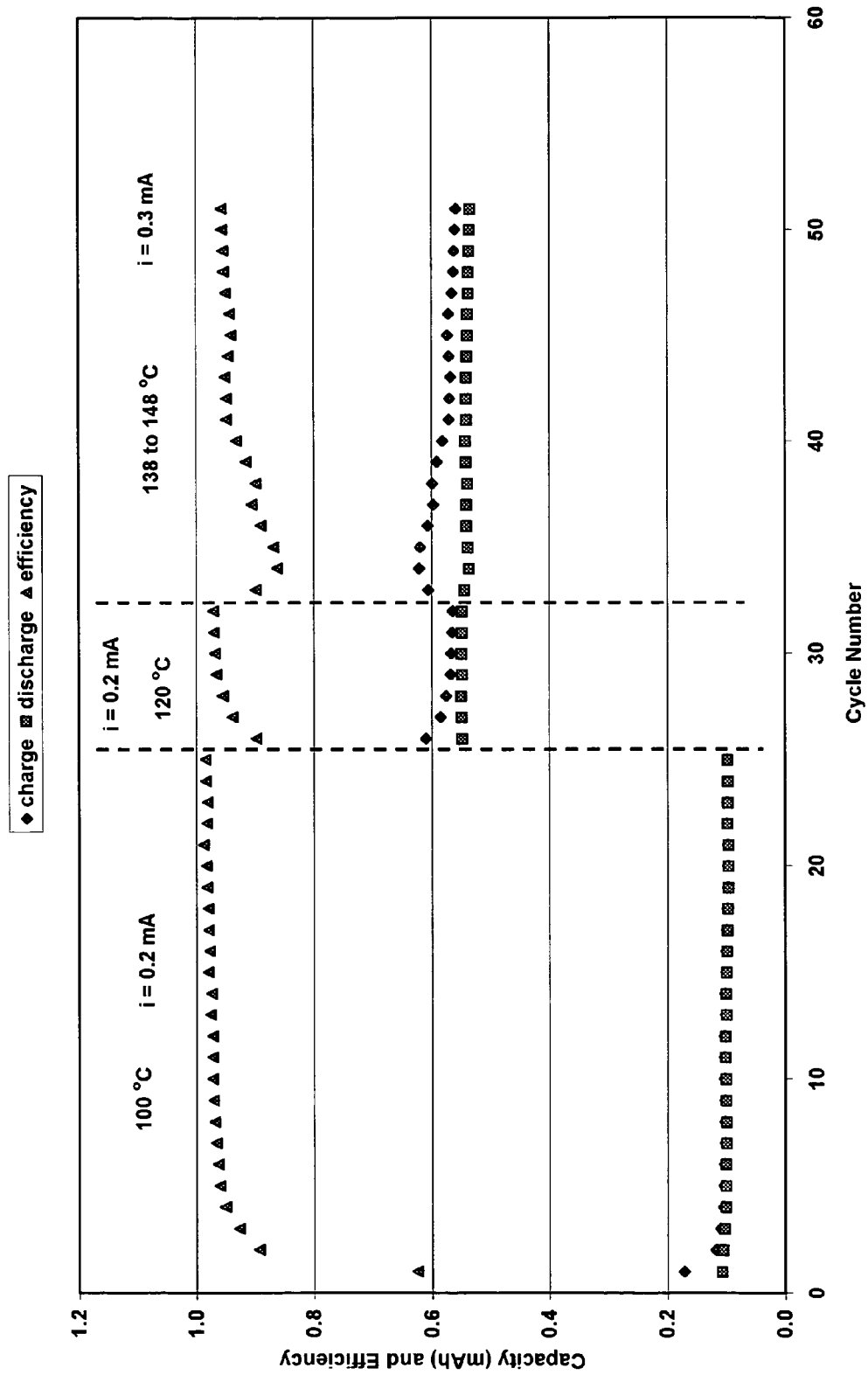
FIG. 10 is a graph illustrating the charging/discharging capacity and efficiency versus cycle number for a test cell, where ratio C/A=2.3, at 100° C., 120° C., and 138-148° C. using 0.2 mA and 0.3 mA currents.

It was cycled at 100° C. (0.2 mA, 2.5/2.0 cut-off voltages), 120° C. (0.2 mA) and at 138° C. to 148° C. (0.3 mA). It showed stable capacity with cycling under all three conditions (FIG. 10).

Example 8

The cell $LiCoO_2$/EMPBETI+0.8 molal $LiBETI/Li_4Ti_5O_{12}$ with the cathode having a practical capacity of 2.85 mAh and the anode with 2.1 mAh (C/A=1.36).

Figure 11:
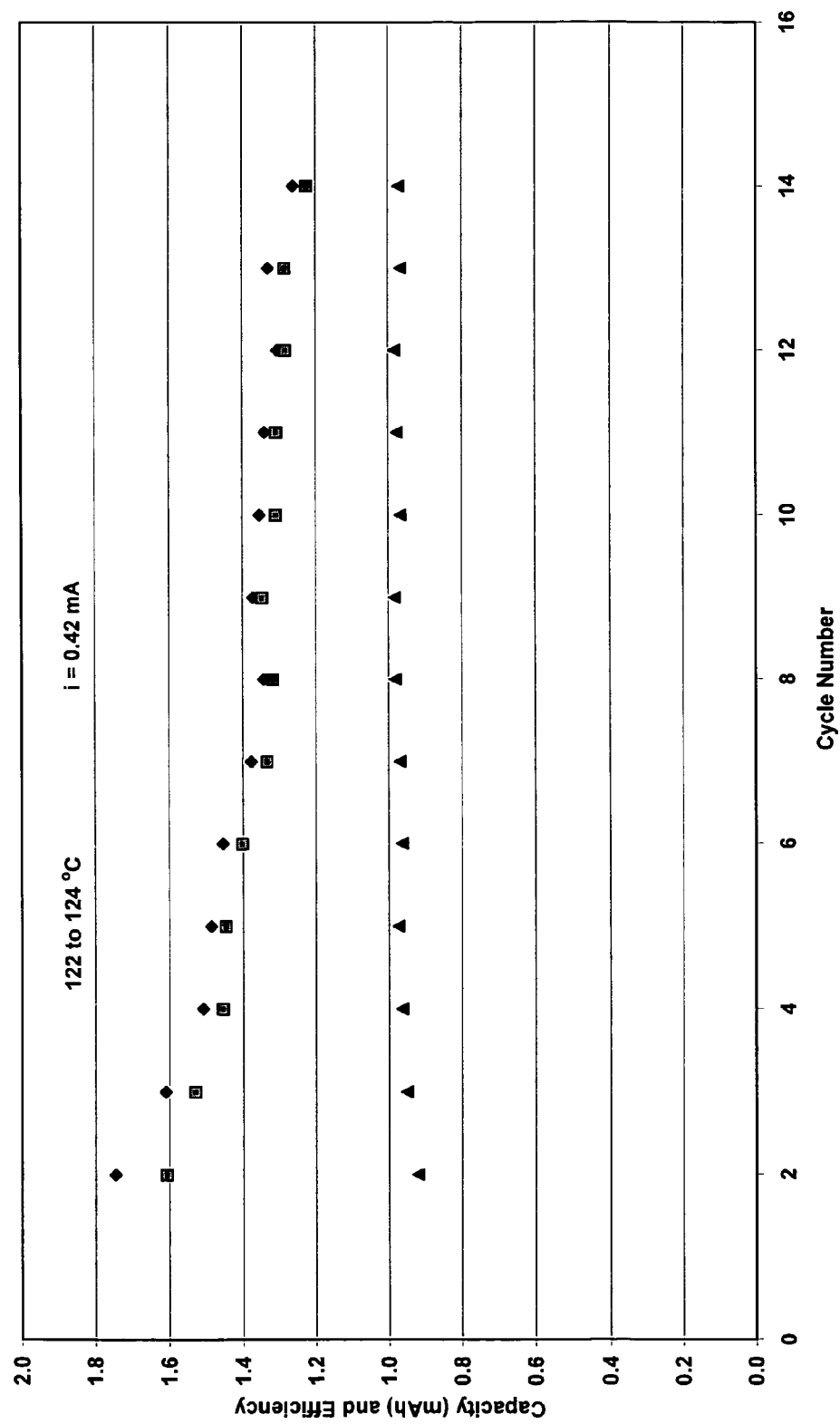
FIG. 11 is a graph illustrating the charging/discharging capacity and efficiency versus cycle number for a test cell, where ratio C/A=1.36, at 122-124° C. using 0.42 mA current.

The cell was cycled at 122° C. to 124° C. (0.42 mA, 2.5/2.0 V cut-off voltages) when the capacity decreased with cycling (24% decrease in 12 cycles, FIG. 11).

Example 9

The cell $LiCoO_2$/EMPBETI+0.8 molal $LiBETI/Li_4Ti_5O_{12}$ with the cathode having a practical capacity of 2.37 mAh and the anode with 0.9 mAh (C/A=2.63).

Figure 12:
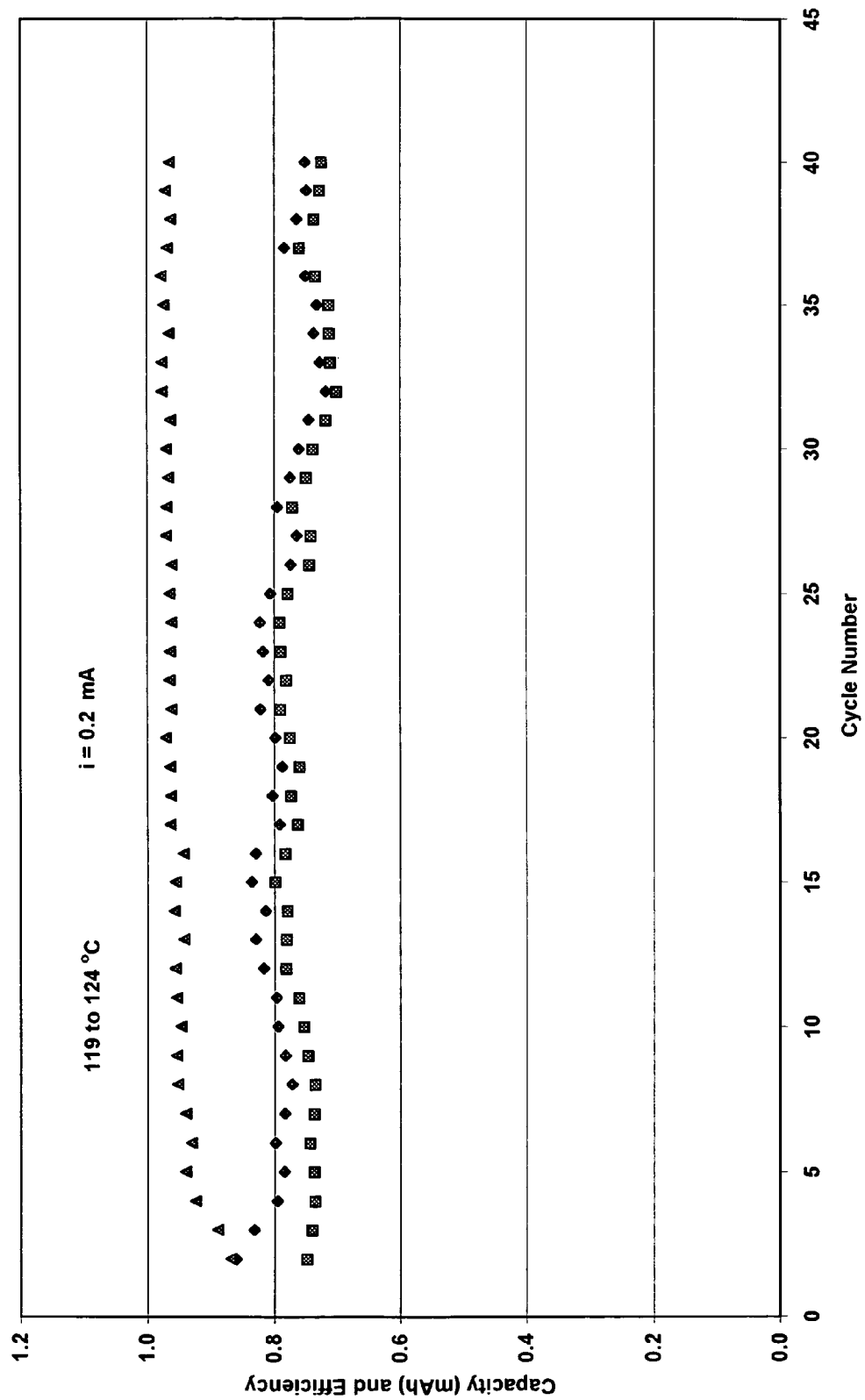
FIG. 12 is a graph illustrating the charging/discharging capacity and efficiency versus cycle number for a test cell, where ratio C/A=2.63 at 119-124° C. using 0.2 mA current.

When the cell was operated at 119° C. to 124° C. (0.2 mA, 2.5/2.0 V cut-off voltages) cell capacity showed much higher stability with cycling (≈3% decrease in 40 cycles, FIG. 12).

Example 10

The cell $LiCoO_2$/DMPBETI+0.8 molal $LiBETI/Li_4Ti_5O_{12}$ with the cathode having a practical capacity of 2.59 mAh and the anode with 2.05 mAh (C/A=1.26).

Figure 13:
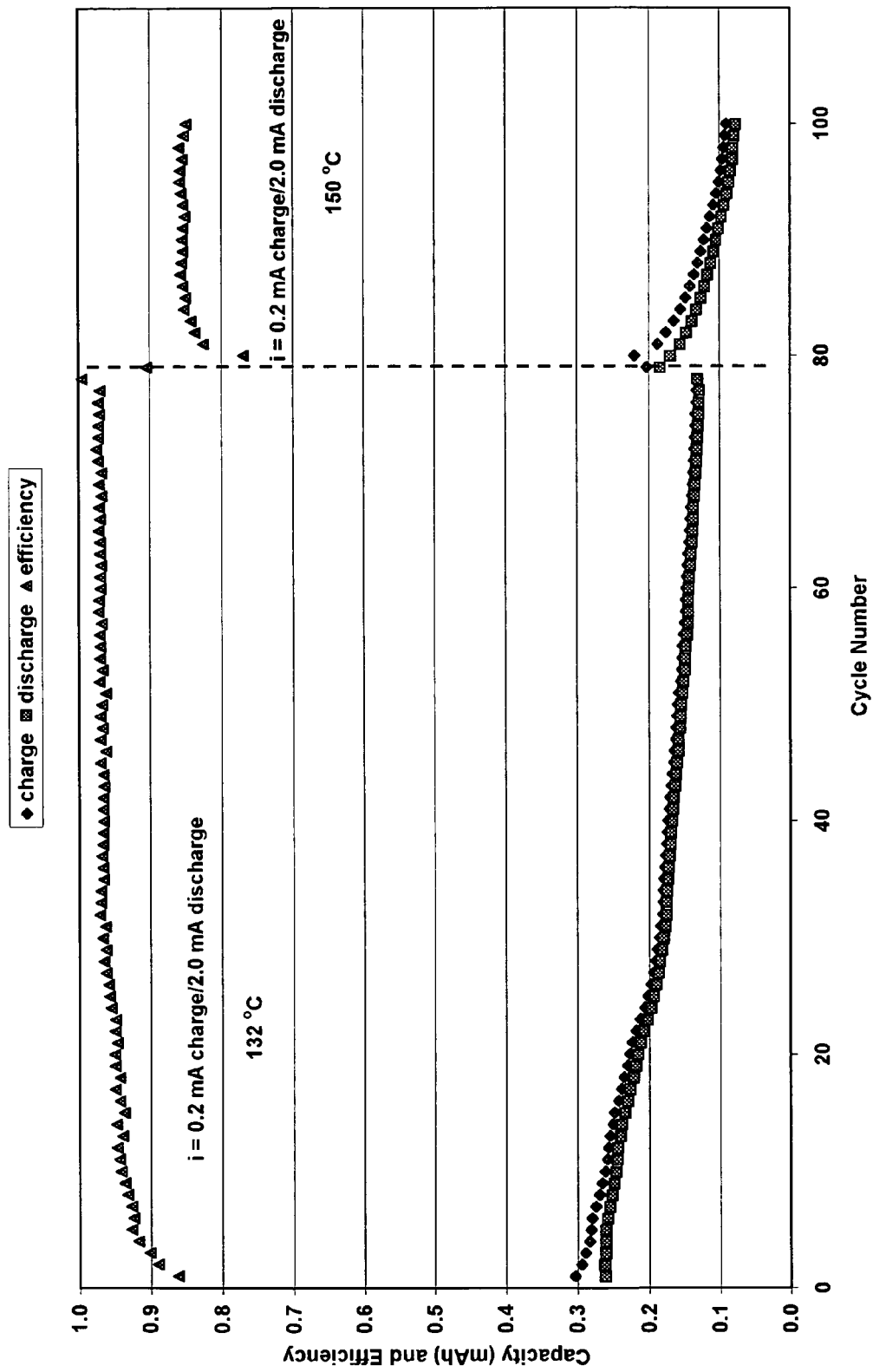
FIG. 13 is a graph illustrating the charging/discharging capacity and efficiency versus cycle number for a test cell, where ratio C/A=1.26, at 132° C. and 150° C. using 0.2 mA charge/2.0 discharge currents.

The cell was cycled at 132° C. (0.2 mA charge/2.0 mA discharge, 2.5/1.8 V cut-off voltages) when the capacity decreased with cycling (50% in about 80 cycles), while at 150° C. it decreased even faster with cycling (55% in 20 cycles, FIG. 13).

Example 11

The cell $LiCoO_2$/DMPBETI+0.8 molal $LiBETI/Li_4Ti_5O_{12}$ with the cathode having a practical capacity of 1.3 mAh and the anode with 0.49 mAh (C/A=2.76).

Figure 14:
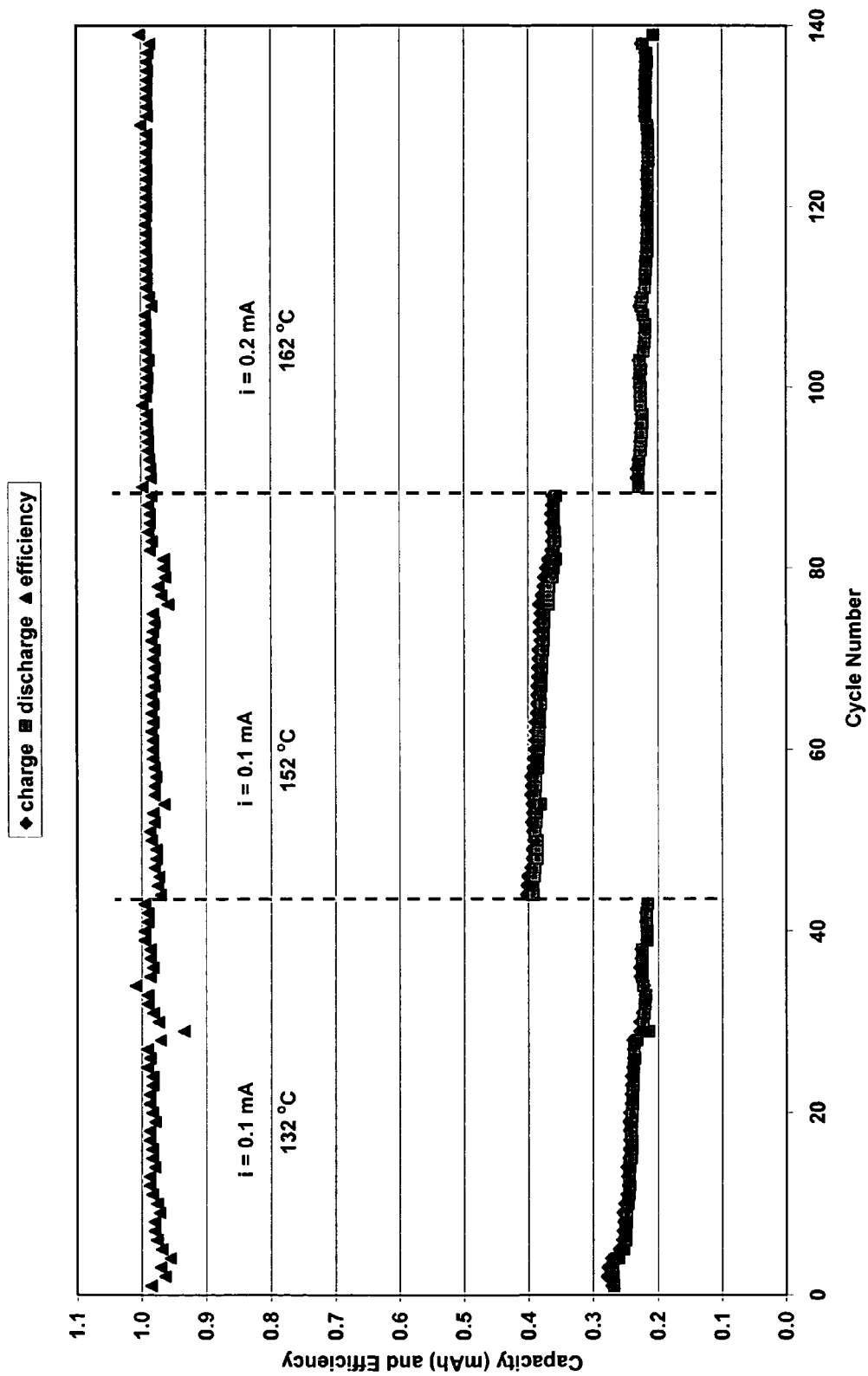
FIG. 14 is a graph illustrating the charging/discharging capacity and efficiency versus cycle number for a test cell, where ratio C/A=2.76, at 132° C., 152° C., and 162° C. using 0.1 mA and 0.2 mA currents.

The cell was cycled at 132, 152 (0.1 mA, 2.5/2.0 V cut-off voltages), and at 162° C. (0.2 mA), when the cell capacity decreased only slightly with continued cycling (FIG. 14).

Figure 15:
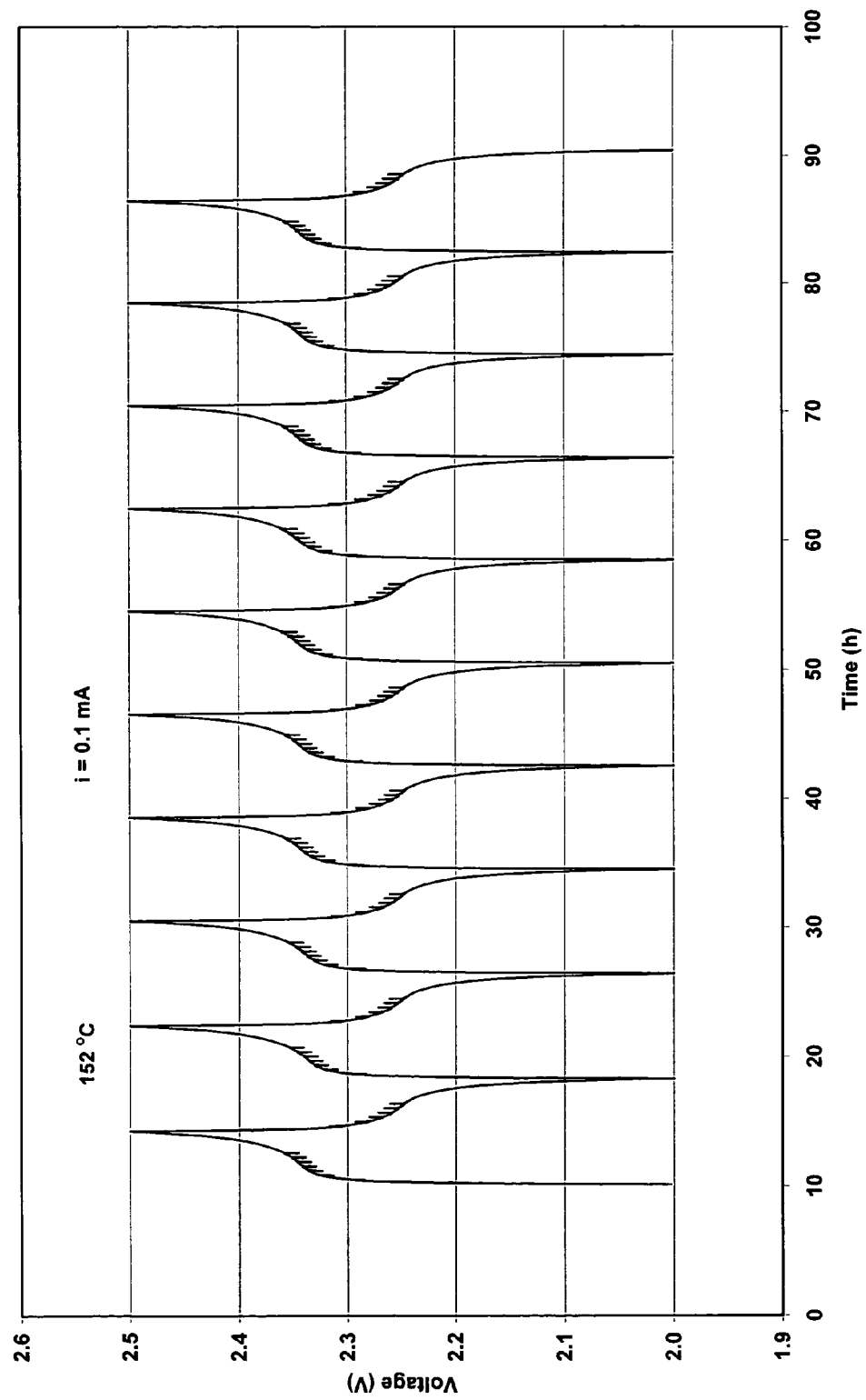
FIG. 15 is a graph illustrating charging/discharging curves for the test cell in FIG. 14, where the ratio C/A=2.76, at 152° C. using 0.1 mA current.

Charge/discharge cycles are shown in FIG. 15.

Example 12

The cell $LiFePO_4$/EMIBETI+0.8 molal $LiBETI/Li_4Ti_5O_{12}$

The $LiFePO_4$ cathode was made by mixing $LiFePO_4$ and carbon with a solution of polyvinylidene fluoride (PVDF, Solvay, Solvay 20810, Solvay Advanced Polymers, Houston, Tex.) in acetone to form a slurry which was stirred to obtain a homogeneous composition. The slurry was spread on an aluminum foil and was dried first in air and next in vacuum at 80° C.-90° C. overnight. The ratio of $LiFePO_4$:C:PVDF was 85:5:10. The $Li_4Ti_5O_{12}$ anode was made as described earlier.

Figure 16:
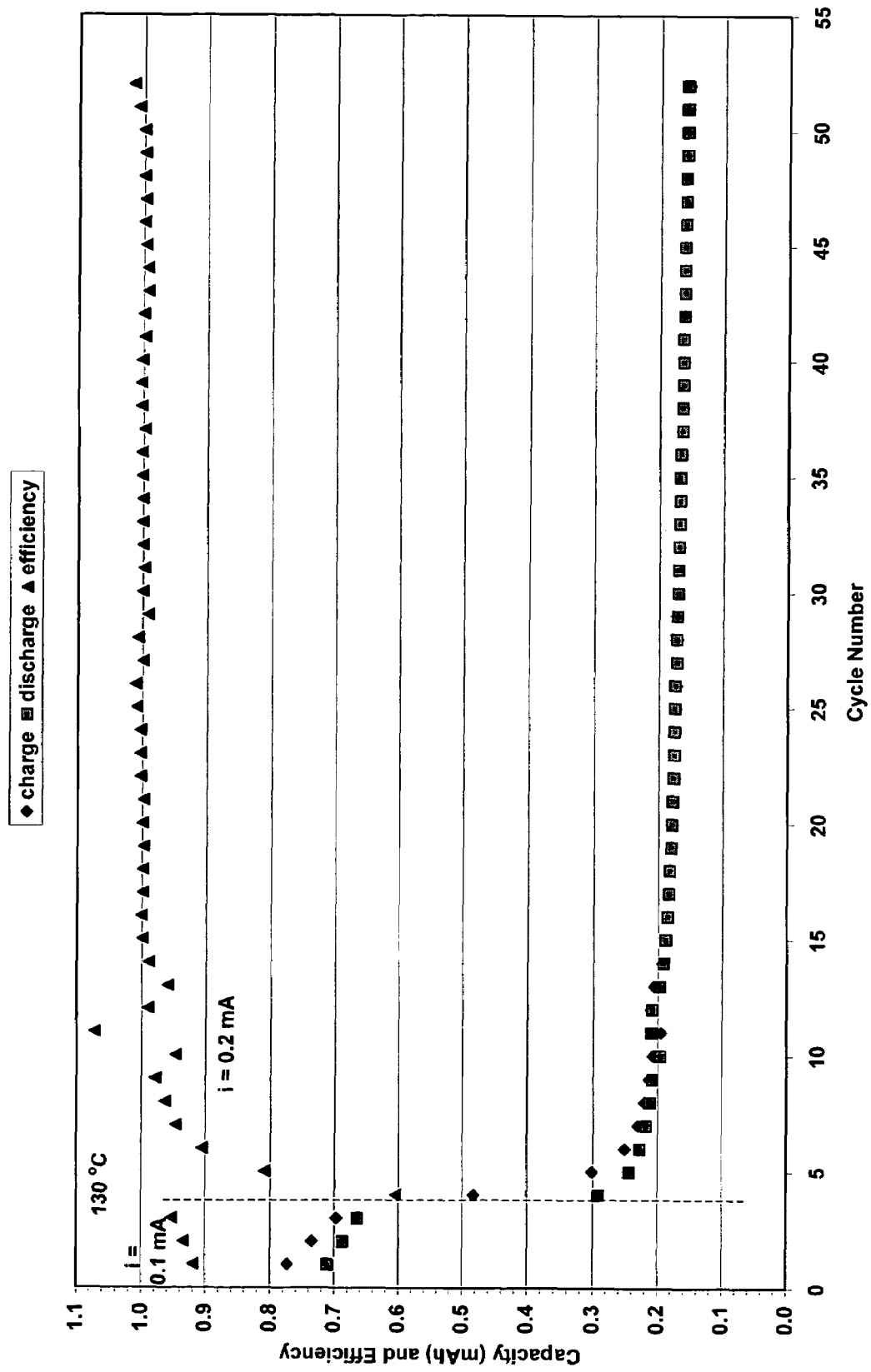
FIG. 16 is a graph illustrating the charging/discharging capacity and efficiency versus cycle number for a test cell, where ratio C/A=2.7, at 130° C. using 0.1 mA current followed by 0.2 mA current.
Figure 17:
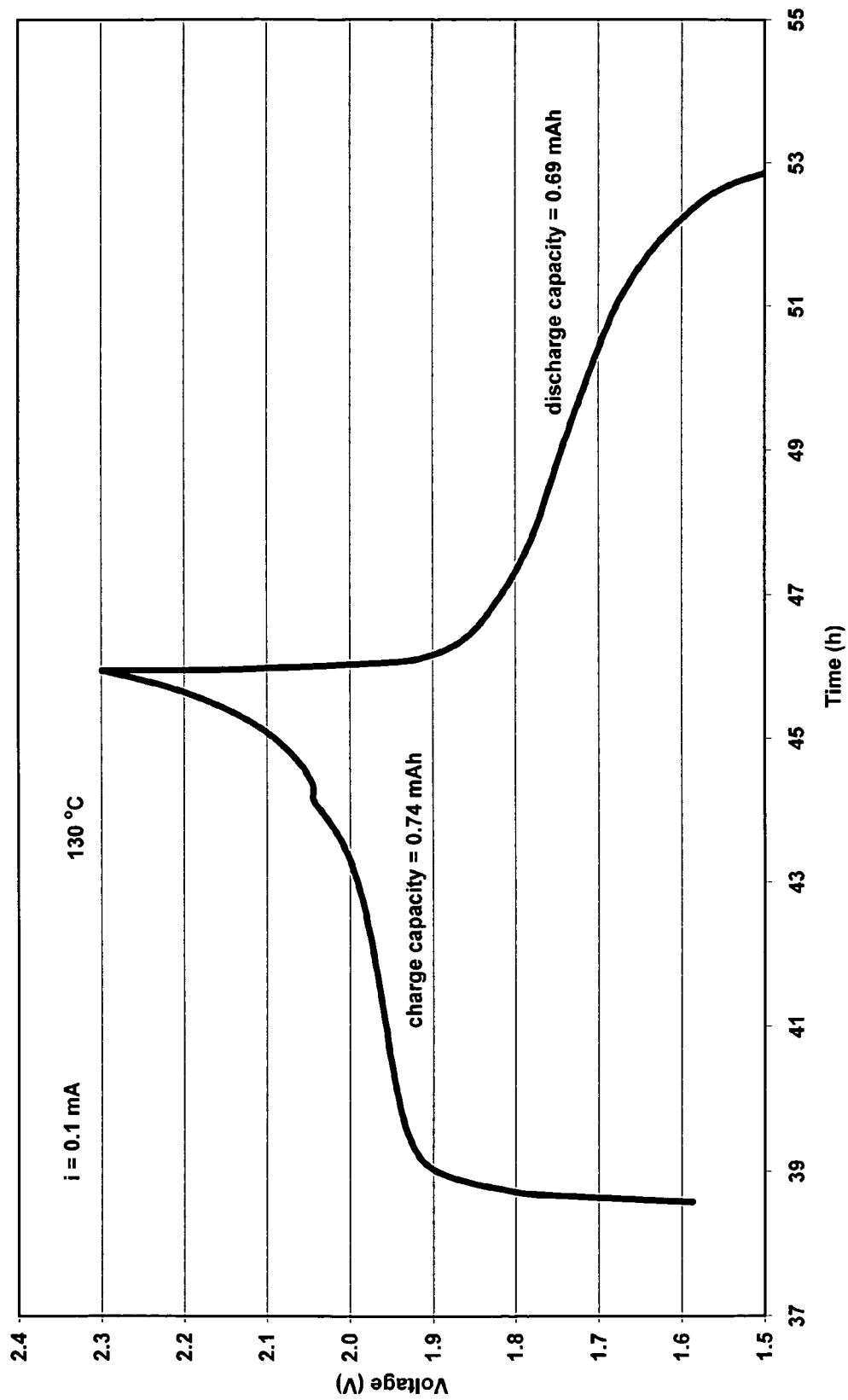
FIG. 17 is a graph illustrating charging/discharging curves for the test cell in FIG. 16, where the ratio C/A=2.7, at 130° C. using 0.1 mA current.

Whatman glass microfibre filter was used as a separator. The diameter of the electrodes was 0.5 inch each. The cathode had a practical capacity of 2.7 mAh and anode had a capacity of a 1.0 mAh. (ratio cathode capacity/anode capacity C/A=2.7). The cut-off voltages for charge/discharge cycling were set at 2.3V on charge and 10.5V on discharge. Results for cycling at 130° C. using 0.1 mA current followed by 0.2 mA are shown in FIG. 16. A charge/discharge cycle is shown in FIG. 17. Initially, the cell capacity decreased rapidly. However, the cell capacity stabilized with cycling, and the cell could be cycled over 35 cycles with 15% loss in capacity.

Although the present invention has been described in connection with preferred embodiments, it will be appreciated by those skilled in the art that additions, modifications, substitutions and deletions not specifically described may be made without departing from the spirit and scope of the invention defined in the appended claims.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An electrochemical cell comprising an anode, a cathode, and an electrolyte, said electrolyte comprising at least one pyrazolium cation, an imidazolium cation, or a combination thereof; and at least one non-Lewis acid derived counter ion, wherein said electrochemical cell has a consistent charge and discharge cycling in a temperature range of from about 20° C. to about 170° C., wherein said counter ion comprises an imide, BETI, methide, TF or any combination thereof, and forms a lithium salt selected from Liimide, LiBETI, Limethide or LiTF or a combination thereof, and wherein said electrochemical cell is rechargeable, wherein said cathode has a cathode capacity and said anode has an anode capacity, and wherein said cathode capacity is greater than said anode capacity.

2. The electrochemical cell of claim 1, wherein said electrolyte comprises a binary salt mixture comprising a mixture of single salts, at least one of which contains said pyrazolium cation or an imidazolium cation.

3. The electrochemical cell of claim 2, wherein said binary salt mixture comprises a second cation which differs from said imidazolium cation.

4. The electrochemical cell of claim 3, wherein said second cation is in the form of a lithium salt selected from LiBETI, Liimide, Limethide, or LiTF.

5. The electrochemical cell of claim 3, wherein said imidazolium cation and said second cation are each in the form of a salt and the two salts are different.

6. The electrochemical cell of claim 3, wherein said imidazolium cation and said second cation are both in the form of a salt and at least one of the two salts comprises DMIBETI, EMIBETI, DMIimide, EMIimide DMImethide, EMImethide, DMITF, or EMITF.

7. The electrochemical cell of claim 2, wherein said binary salt mixture comprises a second cation which differs from said pyrazolium cation.

8. The electrochemical cell of claim 7, wherein said second cation is in the form of a lithium salt selected from LiBETI, Liimide, Limethide, or LiTF.

9. The electrochemical cell of claim 7, wherein said pyrazolium cation and said second cation are each in the form of a salt and the two salts are different.

10. The electrochemical cell of claim 7, wherein said pyrazolium cation and said second cation are both in the form of a salt and at least one of the two salts comprises DMPBETI, EMPBETI, DMPimide, EMPimide DMPmethide, EMPmethide, DMPTF, or EMPTF.

11. The electrochemical cell of claim 1, wherein said electrolyte comprises a ternary salt mixture comprising a mixture of three single salts, at least one of which contains said pyrazolium cation or said imidazolium cation.

12. The electrochemical cell of claim 11, wherein said ternary salt mixture comprises a second cation which differs from said imidazolium cation, and a third cation which differs from said imidazolium cation and said second cation.

13. The electrochemical cell of claim 12, wherein at least one of said second and third cations is in the form of a lithium salt selected from LiBETI, Liimide, Limethide, LiTF, or a combination thereof.

14. The electrochemical cell of claim 12, wherein said imidazolium cation, said second cation, and said third cation are in the form of a salt, and one of the anions of the three salts is different from the other two.

15. The electrochemical cell of claim 12, wherein said imidazolium cation, said second cation, and said third cation are in the form of a salt, and the anions of the three salts are the same.

16. The electrochemical cell of claim 11, wherein said pyrazolium cation or said imidazolium cation, said second cation, and said third cation are in the form of a salt, and at least one of the three salts comprises DMPBETI, DMIBETI, EMPBETI, EMIBETI, DMPimide, EMPimide, DMIimide, EMImide, DMPmethide, DMImethide, EMPmethide, EMImethide, DMPTF, DMITF, EMPTF, or EMITF.

17. The electrochemical cell of claim 14, wherein said imidazolium cation, said second cation, and said third cation are in the form of a salt, and at least one of the three salts comprises DMPBETI, DMIBETI, EMPBETI, EMIBETI, DMPimide, DMIimide, EMPimide, EMImide, DMPmethide, DMImethide, EMPmethide, EMImethide, DMPTF, DMITF, EMPTF, or EMITF and another one of the three salts comprises LiBETI, Liimide, Limethide or LiTF.

18. The electrochemical cell of claim 1, wherein said pyrazolium cation, said imidazolium cation, or a combination thereof is present as a pyrazolium salt, an imidazolium salt, or a pyrazolium and imidazolium salts, together with dissolved lithium salts, which are distributed throughout a polymer matrix.

19. The electrochemical cell of claim 1, wherein said anode comprises a lithium intercalated electrode material.

20. The electrochemical cell of claim 1, wherein said anode comprises $Li_4Ti_5O_{12}$.

21. The electrochemical cell of claim 1, wherein said cathode comprises $Li_xMn_2O_4$; $Li_xCoO_2$, modified $Li_xMn_2O_4$ electrodes; $Li_xMn_{2-x}Cu_xO_4$, wherein $0.1<x<0.5$; $LiMo_{0.02}Mn_{1.98}O_4$, wherein M is selected from B, Cr, Fe, and Ti: a transition metal oxide; or an electrochemically active conductive polymer.

22. The electrochemical cell of claim 1, wherein said cathode is $LiCoO_2$, or $LiFePO_4$.

23. The electrochemical cell of claim 1, wherein said electrochemical cell has a ratio of cathode capacity to anode capacity of 2 or greater.

24. The electrochemical cell of claim 1, wherein said cation has the formula:

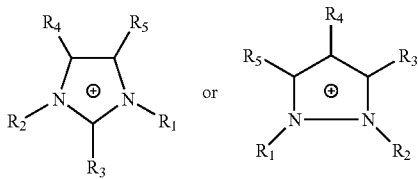

wherein $R_1$ and $R_2$ represent independently an alkyl group comprising 1-12 carbon atoms, and $R_3$, $R_4$, and $R_5$ represent independently, H or an alkyl group comprising from 1 to about 5 carbon atoms.

25. The electrochemical cell of claim 1, wherein said non-Lewis acid derived counterion is:

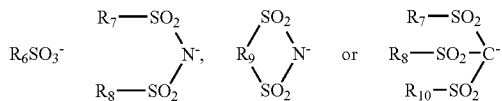

where $R_6$, $R_7$, $R_8$ and $R_{10}$ are separate halogenated alkyl groups of 1 to 4 carbon atoms, and $R_9$ is a halogenated alkylene moiety of 2 to 6 carbon atoms.

26. The electrochemical cell of claim 1, wherein said cathode is $LiCoO_2$ or $LiFePO_4$ and said anode is Li intercalated electrode material.

27. The electrochemical cell of claim 1, wherein for said consistent charge and discharge cycling said electrochemical cell has no more than a 2.3% capacity loss after 12 continuous cycles at 133° C.

28. An electrochemical cell comprising an anode, a cathode, and electrolyte wherein said cell has a ratio of cathode capacity to anode capacity of 2 or greater, wherein the electrolyte comprises an imidazolium or pyrazolium cation and a non-Lewis acid derived anion.

29. The electrochemical cell of claim 28, wherein said ratio is greater than 2.2.

30. The electrochemical cell of claim 28, wherein said ratio is greater than 2.5.

31. The electrochemical cell of claim 28, wherein said ratio is from 2 to 3.

32. The electrochemical cell of claim 28, wherein said anode and said cathode have equal electrode area.

* * * * *

UNITED STATES PATENT AND TRADEMARK OFFICE
CERTIFICATE OF CORRECTION

PATENT NO. : 7,582,380 B1  Page 1 of 1
APPLICATION NO. : 10/820638
DATED : September 1, 2009
INVENTOR(S) : Dunstan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1383 days.

Signed and Sealed this

Fourteenth Day of September, 2010

David J. Kappos
*Director of the United States Patent and Trademark Office*